United States Patent
Baligh et al.

(10) Patent No.: US 10,517,082 B2
(45) Date of Patent: Dec. 24, 2019

(54) MECHANISMS FOR MULTI-TIER DISTRIBUTED CO-OPERATIVE MULTI-POINT TECHNOLOGY

(71) Applicants: Mohammadhadi Baligh, Ottawa (CA); Alireza Bayesteh, Ottawa (CA); Keyvan Zarifi, Ottawa (CA); Usa Vilaipornsawai, Nepean (CA); Yicheng Lin, Ottawa (CA)

(72) Inventors: Mohammadhadi Baligh, Ottawa (CA); Alireza Bayesteh, Ottawa (CA); Keyvan Zarifi, Ottawa (CA); Usa Vilaipornsawai, Nepean (CA); Yicheng Lin, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/181,971

(22) Filed: Jun. 14, 2016

(65) Prior Publication Data
US 2017/0289984 A1    Oct. 5, 2017

Related U.S. Application Data

(60) Provisional application No. 62/316,914, filed on Apr. 1, 2016.

(51) Int. Cl.
*H04W 4/00* (2018.01)
*H04W 72/04* (2009.01)
(Continued)

(52) U.S. Cl.
CPC .......... *H04W 72/042* (2013.01); *H04B 7/024* (2013.01); *H04B 7/0452* (2013.01);
(Continued)

(58) Field of Classification Search
CPC ............. H04W 72/042; H04W 72/046; H04W 72/0466; H04W 72/0473; H04W 72/1231;
(Continued)

(56) References Cited

U.S. PATENT DOCUMENTS 9,385,792 B2 *  7/2016  Seo ...................... H04B 7/0417
9,419,750 B2 *  8/2016  Roh ................... H03M 13/2966
(Continued)

FOREIGN PATENT DOCUMENTS

CN        102130746 A     7/2011
CN        102447524 A     5/2012
(Continued)

OTHER PUBLICATIONS

"5G: A Technology Vision", Huawei Technologies, Co., Ltd., 2013, http://www.huawei.com/5gwhitepaper/, pp. 1-16.
(Continued)

*Primary Examiner* — Chuong T Ho

(57) ABSTRACT

Embodiments of the present disclosure provide mechanisms for the following procedures: network signaling for user equipment (UE) measurements; UE measurements; UE feedback; feedback adjustment at network nodes; scheduling; Acknowledgements/Negative Acknowledgements; and network-wide planning. Some or all of these mechanisms can be used in implementing distributed open-loop multi-user co-operative multi-point (MU-CoMP) technology as well as other non-CoMP, one-tier or centralized wireless transmission technologies. The mechanisms are in line with proposed no-cell technology for 5G communication networks.

11 Claims, 14 Drawing Sheets

(51) Int. Cl.
| | |
|---|---|
| *H04L 1/08* | (2006.01) |
| *H04L 1/18* | (2006.01) |
| *H04L 27/26* | (2006.01) |
| *H04B 7/024* | (2017.01) |
| *H04B 7/0452* | (2017.01) |
| *H04B 7/06* | (2006.01) |
| *H04L 5/00* | (2006.01) |
| *H04W 72/12* | (2009.01) |
| *H04W 52/34* | (2009.01) |
| *H04L 1/00* | (2006.01) |

(52) U.S. Cl.
CPC ......... *H04B 7/0623* (2013.01); *H04B 7/0632* (2013.01); *H04L 1/08* (2013.01); *H04L 1/1812* (2013.01); *H04L 1/1819* (2013.01); *H04L 1/1861* (2013.01); *H04L 1/1896* (2013.01); *H04L 5/005* (2013.01); *H04L 5/0007* (2013.01); *H04L 5/0035* (2013.01); *H04L 5/0044* (2013.01); *H04L 5/0048* (2013.01); *H04L 5/0078* (2013.01); *H04L 5/0094* (2013.01); *H04L 5/0096* (2013.01); *H04L 27/2601* (2013.01); *H04W 72/046* (2013.01); *H04W 72/0406* (2013.01); *H04W 72/0446* (2013.01); *H04W 72/0453* (2013.01); *H04W 72/0466* (2013.01); *H04W 72/0473* (2013.01); *H04W 72/1231* (2013.01); *H04L 1/0003* (2013.01); *H04L 1/0009* (2013.01); *H04L 5/0014* (2013.01); *H04L 5/0026* (2013.01); *H04L 5/0057* (2013.01); *H04W 52/34* (2013.01)

(58) Field of Classification Search
CPC ......... H04W 72/0406; H04W 72/0453; H04W 72/0446; H04W 52/34; H04B 7/0632; H04B 7/0452; H04B 7/024; H04B 7/0623; H04L 5/0035; H04L 1/08; H04L 5/0048; H04L 27/2601; H04L 1/1861; H04L 1/1812; H04L 5/005
See application file for complete search history.

(56) References Cited

U.S. PATENT DOCUMENTS

| | | | |
|---|---|---|---|
| 9,935,757 B2 | 4/2018 | Chung et al. | |
| 10,136,418 B2* | 11/2018 | Roh | H03M 13/2966 |
| 10,334,569 B2* | 6/2019 | Roh | H03M 13/2966 |
| 2007/0265016 A1 | 11/2007 | Kahtava et al. | |
| 2010/0034310 A1 | 2/2010 | Nam et al. | |
| 2010/0195594 A1* | 8/2010 | Seo | H04B 7/0417 370/329 |
| 2010/0273492 A1 | 10/2010 | Liu et al. | |
| 2010/0275083 A1 | 10/2010 | Nam et al. | |
| 2010/0278034 A9 | 11/2010 | Laroia Rajiv et al. | |
| 2010/0322132 A1 | 12/2010 | Ramakrishna et al. | |
| 2011/0085503 A1* | 4/2011 | Nam | H04B 7/0452 370/329 |
| 2011/0103324 A1* | 5/2011 | Nam | H04L 5/0048 370/329 |
| 2011/0110219 A1* | 5/2011 | Nam | H04J 13/0003 370/209 |
| 2011/0110449 A1 | 5/2011 | Ramprashad et al. | |
| 2011/0199985 A1 | 8/2011 | Cai et al. | |
| 2011/0243012 A1 | 10/2011 | Luo et al. | |
| 2011/0268176 A1* | 11/2011 | Jeong | H04L 1/0001 375/240.01 |
| 2012/0034927 A1 | 2/2012 | Papasakellariou et al. | |
| 2012/0057523 A1 | 3/2012 | Ji et al. | |
| 2012/0082101 A1 | 4/2012 | Gaal et al. | |
| 2012/0106442 A1 | 5/2012 | Xiao | |
| 2012/0236741 A1 | 9/2012 | Xu et al. | |
| 2012/0281556 A1 | 11/2012 | Sayana et al. | |
| 2013/0039162 A1* | 2/2013 | Zhang | H04J 13/0003 370/203 |
| 2013/0083719 A1 | 4/2013 | Seo et al. | |
| 2013/0128832 A1* | 5/2013 | Kang | H04W 72/042 370/329 |
| 2013/0165122 A1 | 6/2013 | Tanaka | |
| 2013/0195000 A1 | 8/2013 | Shen et al. | |
| 2013/0231122 A1 | 9/2013 | Vrzic et al. | |
| 2013/0251058 A1 | 9/2013 | Wu et al. | |
| 2013/0315337 A1* | 11/2013 | Dai | H04L 1/0031 375/267 |
| 2013/0322376 A1 | 12/2013 | Marinier et al. | |
| 2013/0329823 A1 | 12/2013 | Khojastepour | |
| 2014/0050202 A1 | 2/2014 | Baligh et al. | |
| 2014/0112173 A1 | 4/2014 | Hammarwall et al. | |
| 2014/0126484 A1 | 5/2014 | Chen et al. | |
| 2014/0161071 A1 | 6/2014 | Nam et al. | |
| 2014/0169408 A1 | 6/2014 | Bayesteh et al. | |
| 2014/0192734 A1 | 7/2014 | Ng et al. | |
| 2014/0362701 A1* | 12/2014 | Roh | H03M 13/2966 370/235 |
| 2014/0365848 A1* | 12/2014 | Roh | H03M 13/2966 714/784 |
| 2014/0369434 A1 | 12/2014 | Taherzadehboroujeni et al. | |
| 2015/0092882 A1 | 4/2015 | Lee et al. | |
| 2015/0244439 A1* | 8/2015 | Nam | H04L 5/0048 370/329 |
| 2015/0289257 A1 | 10/2015 | Luo et al. | |
| 2015/0295695 A1 | 10/2015 | Davydov et al. | |
| 2015/0312074 A1 | 10/2015 | Zhu et al. | |
| 2015/0327274 A1 | 11/2015 | Lim et al. | |
| 2016/0028527 A1* | 1/2016 | Nam | H04J 13/0003 370/329 |
| 2016/0028528 A1* | 1/2016 | Nam | H04J 13/0003 370/329 |
| 2016/0036504 A1 | 2/2016 | Khojastepour et al. | |
| 2016/0080058 A1* | 3/2016 | Kang | H04B 7/0617 370/329 |
| 2016/0087694 A1 | 3/2016 | Vilaipornsawai et al. | |
| 2016/0234820 A1 | 8/2016 | Mallik et al. | |
| 2016/0286549 A1 | 9/2016 | Abraham et al. | |
| 2016/0337149 A1 | 11/2016 | Wu et al. | |
| 2016/0353433 A1* | 12/2016 | Roh | H03M 13/2966 |
| 2017/0006539 A1 | 1/2017 | Kakishima et al. | |
| 2017/0093826 A1* | 3/2017 | Werneyer | G06F 21/6218 |
| 2017/0141886 A1 | 5/2017 | Chung et al. | |
| 2017/0163333 A1 | 6/2017 | Breiling et al. | |
| 2017/0171786 A1* | 6/2017 | Mochizuki | H04W 36/0083 |
| 2017/0202025 A1* | 7/2017 | Ouchi | H04W 74/0833 |
| 2017/0289984 A1 | 10/2017 | Baligh et al. | |
| 2017/0290046 A1 | 10/2017 | Sun et al. | |
| 2017/0359827 A1 | 12/2017 | Kim et al. | |
| 2018/0041988 A1* | 2/2018 | Lee | H04W 72/02 |
| 2018/0159669 A1 | 6/2018 | Chung et al. | |
| 2018/0316371 A1 | 11/2018 | Davydov et al. | |
| 2019/0053224 A1* | 2/2019 | Roh | H03M 13/2966 |

FOREIGN PATENT DOCUMENTS

| | | |
|---|---|---|
| CN | 102804897 A | 11/2012 |
| CN | 102918788 A | 2/2013 |
| CN | 103095401 A | 5/2013 |
| CN | 103220069 A | 7/2013 |
| CN | 103503326 A | 1/2014 |
| CN | 103563321 A | 2/2014 |
| CN | 104335514 A | 2/2015 |
| CN | 104486784 A | 4/2015 |
| CN | 104581845 A | 4/2015 |
| CN | 106063151 A | 10/2016 |
| EP | 3297377 A1 | 3/2018 |
| JP | 2015185955 A | 10/2015 |
| JP | 2016506143 A | 2/2016 |
| WO | 2012020457 A1 | 2/2012 |
| WO | 2012051863 A | 4/2012 |
| WO | 2013068835 A2 | 5/2013 |

(56) References Cited

FOREIGN PATENT DOCUMENTS

| WO | 2014090189 A1 | 6/2014 |
|---|---|---|
| WO | 2014201988 A1 | 12/2014 |

OTHER PUBLICATIONS

Furukawa, Hiroshi et al., "SSDT—Site Selection Diversity Transmission Power Control for CDMA Forward Link", IEEE Journal on Selected Areas in Communications, vol. 18. No. 8, Aug. 2000, pp. 1546-1554.
Gesbert, David et al., "Multi-Cell MIMO Cooperative Networks: A New Look at Interference", IEEE Journal on Selected Areas in Communications, vol. 28, No. 9, Dec. 2010, pp. 1-29.
Chae, Chan-Byoung et al., "Coordinated Beamforming with Limited Feedback in the MIMO Broadcast Channel", IEEE Journal on Selected Areas in Communications, vol. 26, No. 8, Oct. 2008, pp. 1505-1515.
Hoshyar, Reza et al., "Novel Low-Density Signature for Synchronous CDMA Systems Over AWGN Channel", IEEE Transactions on Signal Processing, vol. 56, No. 4, Apr. 2008, pp. 1616-1626.
Nikopour, Hosein et al., "Sparse Code Multiple Access", IEEE 24th International Symposium on Personal, Indoor and Mobile Radio Communications: Fundamentals and PHY Track, Sep. 2013, pp. 332-336.
Van De Beek, Jaap et al. "Multiple Access with Low-Density Signatures", Global Telecommunications Conference, IEEE Globecom, Nov. 2009, pp. 1-6.
Zhang, Shunqing et al., "Sparse Code Multiple Access: An Energy Efficient Uplink Approach for 5G Wireless Systems", Gobal Communications Conference, IEEE Globecom 2014—Wireless Networking Symposium, Dec. 2014, pp. 4782-4787.
Au, Kelvin et al., "Uplink Contention Based SCMA for 5G Radio Access", Proc. IEEE Globecom 2014, Dec. 2014, pp. 1-6.
3GPP TR 36.814 V9.0.0, 3rd Generation Partnership Project; Technical Specification Group Radio Access Network; Evolved Universal Terrestrial Radio Access (E-UTRA); Further advancements for E-UTRA physical layer aspects (Release 9), 3GPP, Apr. 2013, pp. 1-104.
Taherzadeh, Mahmoud et al., "SCMA Codebook Design", IEEE VTC Fall, Sep. 2014, pp. 1-5.
Zarifi, Keyvan et al,. "Radio Access Virtualization: Cell follows User", IEEE 25th International Symposium on Personal, Indoor and Mobile Radio Communications, Sep. 2014, pp. 1381-1385.
"The Second Phase of LTE-Advanced, LTE-B: 30-fold Capacity Boosting to LTE", Huawei Technologies, Co., Ltd., 2013, http://www.huawei.com/en/industry-insights/huawei-voices/white-papers/hw_259010, pp. 1-20.
Agrawal, Rajeev et al., "Dynamic Point Selection for LTE-Advanced: Algorithms and Performance", IEEE WCNC'14 Track 2 (MAC and Cross-Layer Design), 2014, pp. 1-6.
Karakayali, M. Kemal et al., "Network Coordination for Spectrally Efficient Communications in Cellular Systems", IEEE Transactions on Wireless Communications, vol. 13, No. 4, Aug. 2006, pp. 56-61.
Dahrouj, Hayssam et al., "Coordinated Beamforming for the Multicell Multi-Antenna Wireless System", IEEE Transactions on Wireless Communications, vol. 9, No. 5, May 2010, pp. 1748-1759.
Zte, RP-151790 "Motivation for study on enhancements for densely deployed small cells in LTE", 3GPP TSG RAN Meeting #70, Dec. 7-10, 2015, pp. 1-8, Sitges, Spain.
Zte, RP-150612 "Initial Analysis of Ultra Dense Network", 3GPP TSG RAN Meeting #68, Jun. 15-18, 2015, pp. 1-6, Malmö, Sweden.
Zhu, Jianchi, et al, "A Practical Design of Downlink Coordinated Multi-Point Transmission for LTE-Advanced", IEEE 31, Dec. 31, 2010, pp. 1-6, China.
Catt, R1-122043, "On downlink control signaling for CoMP", 3GPP TSG RAN WG1 Meeting #69, May 21-25, 2012, pp. 1-3, Prague, Czech Republic.
Usa Vilaipornsawai et al.,"SCMA for Open-Loop Joint Transmission CoMP",Computer Science,dated Apr. 7, 2015, total 5 pages.
Malte Schellmann ,"Mobile and wireless communications Enablers for the Twenty-twenty Information Society (METIS)"—Proposed solutions for new radio access Deliverable D2.4,Document No. ICT-317669-METIS/D2.4, dated Feb. 28, 2015,total 190 pages.
Usa Vilaipornsawai, SCMA for Open-Loop Joint Transmission CoMP, 2015 IEEE 82nd Vehicular Technology Conference, Sep. 6, 2015, total 7 pages.

* cited by examiner

MECHANISMS FOR MULTI-TIER DISTRIBUTED CO-OPERATIVE MULTI-POINT TECHNOLOGY

CROSS-REFERENCE TO RELATED APPLICATION

This application claims the benefit of U.S. Provisional Patent Application Ser. No. 62/316,914 filed on Apr. 1, 2016, the entire content of which is incorporated herein by reference.

FIELD OF THE APPLICATION

The application relates to wireless communication generally, and, in particular embodiments, to systems and methods for enabling co-operative multi-point (CoMP) technology.

BACKGROUND

To support high capacity demand and new applications in evolving networks such as fifth generation (5G) wireless networks, ultra-dense networks (UDN) and moving networks (MN) are being developed. Such network architectures are challenged by high capacity demand, severe inter-cell interferences, frequent handovers, and fast moving users, among other challenges. Technologies such as Coordinated multipoint (CoMP) or Joint transmission (JT) CoMP, Coordinated beam forming/scheduling (CB/CS) CoMP, and multi-user multiple-input and multiple-output (MU-MIMO) based on beam forming are being proposed to alleviate such challenges. However, such CoMP and MU-MIMO schemes are closed-loop schemes, requiring channel state information (CSI) feedback with high overhead. The CSI feedback is also sensitive to channel aging and feedback error. Sparse Code Multiple Access (SCMA) is a transmission scheme with relatively low complexity receiver design and good performance. SCMA can offer high spectral efficiency by supporting overloaded systems having more connected devices or traffic than orthogonal resources. A Multi-user SCMA (MU-SCMA) scheme can also increase throughput and coverage, and support open-loop (OL) user multiplexing with low feedback overhead and with less sensitivity to channel aging and feedback error.

However, there is still a need for more efficient CoMP systems.

SUMMARY

One aspect of the present disclosure provides a method in a network node. The network node transmits a pilot pattern and control information. The control information associates one or more first transmit layers with the pilot pattern. The first transmit layers have predefined modulation and coding and may be multiplexed in a time-frequency resource space in at least one of: a time domain, a frequency domain, a code domain, a power domain, and a space domain.

In some embodiments, for each transmit layer the control information indicates the pilot pattern and the predefined MCS that are associated with the transmit layer. The information indicating a predefined MCS associated with the transmit layer may include information associating the predefined MCS with the pilot pattern associated with the transmit layer. In some embodiments, the control information may also include information indicating a transmit power associated with the transmit layer.

In some embodiments, the first transmit layers are transmitted using sparse code multiple access (SCMA) or low density signature orthogonal frequency division multiplexing (LDS-OFDM) waveforms. In such embodiments, the control information may further include information indicating codebooks or signatures associated with the first transmit layers.

The method may further include receiving, from a user equipment (UE), feedback information identifying first transmit layers the UE was able to jointly detect; and scheduling data transmission for the UE based on the feedback information. For example, this information may identify indices of the first transmit layers the UE was able to jointly detect In some embodiments, the first transmit layers are multiplexed in a first transmission tier. In such embodiments, the method may further include receiving feedback information from a UE that includes information identifying first transmit layers the UE was able to jointly detect in the first transmission tier and/or information identifying channel quality indicators (CQIs) for second transmit layers having adaptive modulation and coding and being multiplexed in a second transmission tier. The first and second transmission tiers may be in respective time-frequency resource spaces that at least partially overlap. The network node may then schedule data transmission for the UE based on the feedback information.

In some cases, the network node may adjust the feedback information received from the UE before scheduling the UE. For example, the network node may adjust the feedback information based on an average number of transmit layers the UE has received at each of a number of scheduling intervals, then schedule data transmission for the UE based on the adjusted feedback information.

In some embodiments, the network node receives a feedback adjustment instruction from a central coordinator. regarding adjustment of the feedback information for the UE. The network node may adjust the feedback information in accordance with the feedback adjustment instruction, and then schedule data transmission for the UE based on the adjusted feedback information.

In some embodiments, the network node may trigger a hybrid automatic repeat request (HARQ) mechanism and/or an outer loop link adaptation (OLLA) mechanism in the second transmission tier based on receipt of an acknowledgement (ACK) or negative acknowledgement (NACK) from the UE regarding a data packet transmitted in the second transmission tier. In response to receiving a NACK from the UE regarding a data packet transmitted in the second transmission tier, the network node may reschedule the data transmission in the first transmission tier if a resend rate in the second transmission tier is below a threshold.

In some embodiments, the time-frequency resource space includes multiple of zones of time-frequency resources. In such embodiments, the feedback information identifying the first transmit layers the UE was able to jointly detect may include zone-specific feedback for one or more of the zones. For example, the zone-specific feedback may identify, for each of at least one of the zones, jointly detectable first transmit layers the UE was able to jointly detect in the zone.

In embodiments in which the time-frequency resource space includes multiple of zones of time-frequency resources, the control information may include zoning information identifying, for each of at least one of the zones, an associated set of transmission parameters for the zone.

Another aspect of the present disclosure provides a network device configured to perform the method according to the above aspect of the present disclosure. For example, such a network device may include a wireless interface, a processor operatively coupled to the wireless interface, and a computer readable storage medium operatively coupled to the processor, the computer readable storage medium storing programming for execution by the processor that includes instructions to perform the method according to the above aspect of the present disclosure.

Yet another aspect of the present disclosure provides a method in a UE. The UE determines a respective channel estimate for each of one or more received pilot patterns. Using the channel estimates and information associating pilot patterns with transmit layers, the UE identifies jointly detectable first transmit layers having predefined modulation and coding. The first transmit layers may be multiplexed in a time-frequency resource space in at least one of: a time domain, a frequency domain, a code domain, a power domain, and a space domain. The UE may then send feedback information identifying the first transmit layers it was able to jointly detect. For example, the feedback information may identify indices of the jointly detectable first transmit layers or a minimum power sharing factor for the first transmission tier that is required to decode L first transmit layers in the first transmission tier, where L is an integer.

In some embodiments, each first transmit layer has an associated pilot pattern, predefined modulation and coding scheme (MCS), and transmit power. In such embodiments, the UE may determine joint detectability of a first transmit layer based on: the channel estimate that is associated with the pilot pattern that is associated with the first transmit layer, the predefined MCS that is associated with the first transmit layer, and the transmit power that is associated with the first transmit layer.

In some embodiment, the UE also receives control information associating first transmit layers with pilot patterns and predefined MCSs. In some cases, the control information may also associate first transmit layers with transmit powers. For example, the control information may associate first transmit layers with a power sharing factor. The control information may also associates first transmit layers with codebooks or signatures.

In some embodiments, the first transmit layers are multiplexed in a first transmission tier. In such embodiments, the method may further include determining signal-to-interference-plus-noise ratios (SINRs) for second transmit layers using the channel estimates and the information associating transmit layers with pilot patterns. The second transmit layers may have adaptive modulation and coding and may be multiplexed in a second transmission tier. The first and second transmission tiers may be in respective time-frequency resource spaces that at least partially overlap. The UE may jointly detect first transmit layers in the first transmission tier, treating second transmit layers in the second transmission tier as interference. For example, the UE may jointly detect first transmit layers in the first transmission tier using a joint reception technique selected from the group consisting of successive interference cancellation (SIC), a message passing algorithm (MPA), maximum likelihood detection (MLD), Linear Minimum Mean Square Error (LMMSE), and combinations thereof.

In some embodiments, the UE determines channel quality indicators (CQIs) for the second transmit layers based on the SINRs for the second transmit layers. The feedback information that the UE sends may include information indicating the CQIs determined for the second transmit layers.

In some embodiments, each second transmit layer has an associated pilot pattern and transmit power. In such embodiments, the UE may determine the SINR for a second transmit layer based on: the channel estimate that is associated with the pilot pattern that is associated with the second transmit layer and the transmit power associated with the second transmit layer. For example, the UE may determine SINRs for second transmit layers by subtracting, from a received signal, the jointly detectable first transmit layers; and from a remainder of the received signal remaining after the subtraction of the jointly detectable first transmit layers, determining SINRs for the second transmit layers.

In some embodiments, the time-frequency resource space include multiple zones of time-frequency resources. In such embodiments, the UE may send zone-specific feedback information identifying, for each of at least one of the zones, jointly detectable first transmit layers in the zone.

Still another aspect of the present disclosure provides a UE configured to perform the method according to the above aspect of the present disclosure. For example, such a UE may include a wireless interface, a processor operatively coupled to the wireless interface, and a computer readable storage medium operatively coupled to the processor, the computer readable storage medium storing programming for execution by the processor that includes instructions to perform the method according to the above aspect of the present disclosure.

BRIEF DESCRIPTION OF THE DRAWINGS

Embodiments will now be described with reference to the attached drawings in which.

DETAILED DESCRIPTION OF EMBODIMENTS

For illustrative purposes, specific example embodiments will now be explained in greater detail below in conjunction with the figures.

The embodiments set forth herein represent information sufficient to practice the claimed subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Turning now to the figures, some specific example embodiments will be described.

Figure 1:
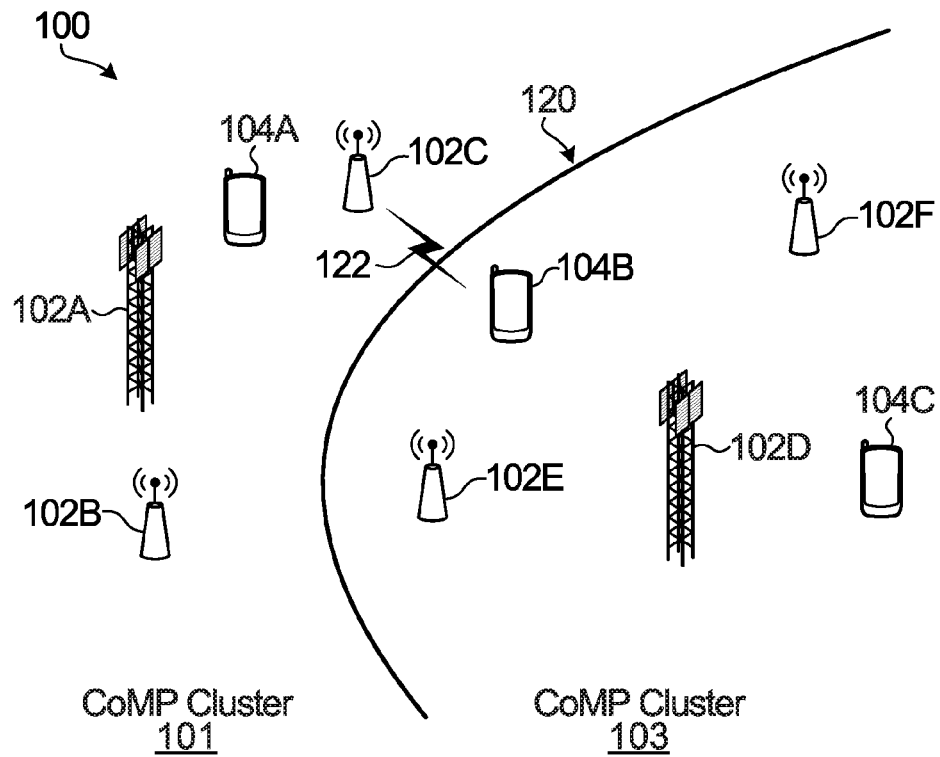
FIG. 1 is a block diagram illustrating a pre-planned CoMP clustering scheme in a communication network.

FIG. 1 is a block diagram illustrating a pre-planned CoMP clustering scheme in a communication network 100. The portion of the communication network 100 shown in FIG. 1 is at a cluster-edge 120 between pre-planned CoMP clusters 101 and 103. The first pre-planned CoMP cluster 101 includes three network nodes 102A, 102B, 102C, which may also be referred to as transmission points or TPs. Network nodes 102A, 102B, 102C provide wireless communication service within CoMP cluster 101. The second pre-planned CoMP cluster 103 also includes three network nodes 102D, 102E, 102F that provide wireless communication service within CoMP cluster 103. Each network node 102 may be implemented using a radio transceiver, one or more antennas, and associated processing circuitry, such as antenna radio frequency (RF) circuitry, analog-to-digital/digital-to-analog converters, etc. However, the network nodes may be configured differently with different capabilities. For example, network nodes 102A and 102D may be evolved NodeBs (eNBs) and network nodes 102B, 102C, 102E and 102F may be picocells, femtocells, or the like.

User equipment (UE) 104A is located in the first CoMP cluster 101 and therefore may receive wireless communication service using one or more of the network nodes 102A, 102B, 102C in that cluster. UEs 104B, 104C are located in the second CoMP cluster 103 and therefore may receive wireless communication service using one or more of the network nodes 102D, 102E, 102F in that cluster. Each UE 104 includes a radio transceiver, one or more antennas, and associated processing circuitry, such as antenna radio frequency (RF) circuitry, analog-to-digital/digital-to-analog converters, etc. The network nodes 102 and the UEs 104 may include similar types of components to support communications with each other in the communication network 100, but the actual implementations may be different. For example, a UE is portable between locations, whereas a network node is typically intended to be installed at a fixed location.

Pre-planned CoMP cluster schemes such as the one illustrated in FIG. 1 were conceived in part to mitigate interference problems at cell-edges in cellular systems where a single transmission point provides coverage within a cell boundary. However, as shown in FIG. 1, this cell-edge interference problem still exists at the cluster-edge in pre-planned clustering schemes, where a UE near a cluster-edge may experience strong interference from a neighboring cluster. For example, as depicted in FIG. 1, UE 104B is located within the second CoMP cluster 103 near the cluster-edge 120, and may experience strong interference 122 from transmissions by one or more of the network nodes 102A, 102B, 102C in the first CoMP cluster 101.

Figure 2:
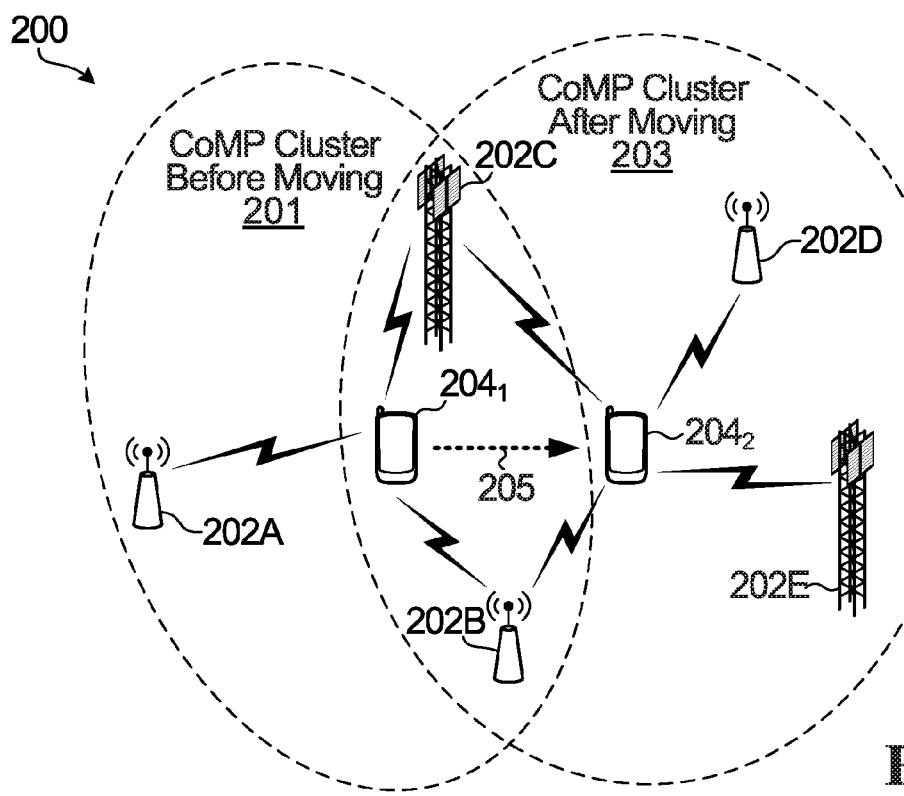
FIG. 2 is a block diagram illustrating a UE-centric CoMP clustering scheme in a communication network.

A UE-centric CoMP clustering scheme can potentially eliminate or at least mitigate the cluster-edge interference problem by dynamically selecting neighboring network nodes that can best serve a given UE. FIG. 2 is a block diagram illustrating a UE-centric CoMP clustering scheme in a communication network 200.

In FIG. 2, different locations of a UE 204 are shown at 204₁ and 204₂. The 204₁ and 204₂ labels are intended to denote the different locations of the same UE 204 rather than different UEs. Movement of the UE is shown at 205.

The UE 204 is exposed to multiple communication signals at each location 204₁, 204₂. At location 204₁, for example, the UE 204 is exposed to communication signals from the network nodes 202A, 202B, 202C, and thus those nodes may be considered a potential network node CoMP cluster 201 to provide service to the UE 204.

As the UE 204 moves, the subset of network nodes that could potentially provide service to the UE could change. In Ultra Dense Networks (UDNs), network nodes that provide wireless communication service to UEs are located closer to each other than in less dense "macro" networks. A UE in a UDN may therefore transition between service areas of different network nodes when it is moved over a smaller distance relative to the distance for transitions between service areas in less dense networks. Service area transitions by UEs may also occur more often in UDNs. A UE may monitor a metric, such as a received power measurement from network nodes in its vicinity, to determine network nodes that could potentially be included in its serving set. When a UE moves and is under the coverage of a different set of network nodes, the network may proactively or reactively respond by assigning a new set of network nodes to the user. In the illustrated example, as the UE 204 moves from the location $204_1$ to the location $204_2$, as represented at 205, the subset of network nodes that could potentially provide service to the UE changes as the network node 202A is dropped from the potential serving set of network nodes and two new network nodes 202D, 202E are added to the potential serving set of network nodes. This change results in a new network node CoMP cluster 203 for the UE 204 at location $204_2$. The potential network node subset could be updated using one or more of uplink (UL) reciprocity, a tracking channel, user feedback, location services, etc. Movement of the UE 204 from the location $204_1$ to the location $204_2$ could be detected by a centralized processing system (not shown), for example, which could also inform the network nodes 202D and 202E that they are now part of the potential network node subset for the UE 204. The network node 202A could similarly be informed, by a centralized processing system or other component in the communication network 200, that it is no longer part of the subset that is providing service to the UE 204. In other implementations, movement of the UE 204 from the location $204_1$ to the location $204_2$ could be detected by the UE 204 itself, which could also inform the network nodes 202D and 202E that they are now part of the potential network node subset for the UE 204 and inform network node 202A that it is no longer part of the subset that is providing service to the UE 204.

In order to implement this UE-centric CoMP approach, open-loop, and distributed CoMP schemes with robustness to mobility are needed.

A multi-tier communication signaling approach to scheduling and transmission for distributed open-loop multi-user CoMP has been proposed. A network node schedules data transmissions for UEs in two transmission tiers. The two transmission tiers include first and second transmission tiers in respective time-frequency resources that at least partially overlap. A predefined modulation and coding that is known to the UEs is used in the first transmission tier, whereas adaptive modulation and coding is used in the second transmission tier. The network node then transmits data to the UEs in the two transmission tiers according to the scheduling. This multi-tier approach enables open-loop multi-user multiplexing with robustness to mobility and channel aging and allows UEs to be multiplexed in the power/code domain over the same time/frequency/space resources. The modulation and coding in the second transmission tier may be based on channel quality indicator (CQI) feedback information, for example. In other embodiments, some form of fast link adaptation, such as outer loop link adaptation (OLLA) may be enabled in the second transmission tier. In some cases, the second transmission tier may be configured and used for closed-loop multiple-user multiple-input and multiple-output (MU-MIMO) communication.

In the multi-tier approach, scheduling and transmission can be done independently by each network node, or with some limited co-ordination between network nodes. This can potentially reduce the amount of backhaul communication between network nodes that is often required in conventional CoMP transmission schemes where channel state information (CSI) must be shared among co-operating network nodes serving a UE. The potential serving set of network nodes that could cooperate in a network node cluster to serve a UE can be determined by the UE itself, i.e., a UE-determined UE-centric clustering scheme, instead of being formed at the network level. As a UE moves to a new location, the potential serving set of network nodes may be updated based on the effective channel condition between network node transmit points and the UE as a transmitter (uplink channel condition) and/or a receiver (downlink channel condition) at the new location. The location of the UE impacts the distance and hence path loss between the transmitters and receivers. Also, it may impact the effect of shadowing caused by the obstacles in the vicinity. In many cases, the potential serving set of network nodes is predominantly updated based on long term channel condition such as path loss and channel correlation, leaving short term variations to be considered by the scheduler/beamformer. On the network side, a network node may be configured to recognize those UEs that have the network node included in their potential serving set, and treat those UEs as candidates for scheduling.

A UE can receive CoMP transmissions once the UE has transmissions scheduled by multiple network nodes. Joint detection techniques such as Successive Interference Cancellation (SIC), Message Passing Algorithm (MPA), Maximum Likelihood Detection (MLD), Linear Minimum Mean Square Error (LMMSE), or a combination of these techniques, allow a UE to jointly detect transmissions in the first transmission tier, which could be received from multiple network nodes, treating transmissions in the second transmission tier as interference. The term "jointly detect" is used herein to refer to receiving and decoding and/or mitigating interference in the information stream level, coded stream level or modulation symbol level. If a transmission has been scheduled for a UE in the first transmission tier, the UE uses the predefined modulation and coding in the first transmission tier of network nodes in its vicinity to try to detect the UE's scheduled transmission in the first transmission tier jointly with other transmissions not intended for the UE that may also be present in the first transmission tier. For example, the UE may use one or more of the joint detection techniques mentioned above to detect its scheduled transmission jointly with the other transmissions in the first transmission tier. If a transmission has been scheduled for the UE in the second transmission tier, then after having jointly detected transmissions in the first transmission tier, the UE subtracts the jointly detected transmissions from the received transmissions and detects its scheduled transmission from the remainder of the received transmissions.

The transmissions in the first transmission tier may be transmitted in multiple layers that are multiplexed in a time domain, a frequency domain, a code domain, a power domain, and/or a space domain. These transmission layers, also referred to as simply "layers" herein, could include respective data streams in an Orthogonal Frequency Division Multiplexing (OFDM) domain, a code domain using respective codebooks, and/or a spatial domain, for example. In a code domain, communication signals associated with different transmit layers may be encoded using different predefined modulation and coding schemes. In some implementations, incoming bits are mapped to sparse multi-dimensional complex codewords selected from predefined codebook sets in an approach that may also be known as Sparse Code Multiple Access (SCMA). Spatial domain transmit layers could be transmit layers in a Multiple Input Multiple Output (MIMO) system, for example.

Transmissions to multiple UEs in the first transmission tier can be supported by using a layer-based multiplexing in the first transmission tier, where each UE that has a transmission scheduled in the first transmission tier is allocated a respective set of one or more transmit layers in the first transmission tier. Transmissions to multiple UEs in the second transmission tier can be supported using multiple access techniques, such as non-orthogonal multiple access or multi-user SCMA (MU-SCMA), for example. In some implementations, first transmission tier and second transmission tier transmissions may partially collide, meaning that they may collide over some resources but not collide over other resources. For example, in one implementation the second transmission tier is designed to cover all of the time-frequency resources in a spectrum band and the first tier is designed to cover only a subset of the time-frequency resources to provide service to the mobility and cell edge users. In another implementation, where there is not enough traffic to justify the second tier occupying the entire spectrum band, the second transmission tier is designed to cover only a subset of the time-frequency resources, and the whole band can be assigned to the first transmission tier for better mobility handling.

Mechanisms for the following procedures are disclosed, that can be used for implementing the proposed distributed multi-tier CoMP technology:

Network signaling for UE measurements
UE measurements
UE feedback
Feedback adjustment at network nodes
Scheduling
ACK/NACK
Network-wide planning The present disclosure proposes mechanisms for the above procedures. Some or all of the above mechanisms can be used in other non-CoMP, one-tier or centralized wireless transmission technologies. The proposed mechanisms are in line with proposed no-cell technology for 5G communication networks. Each of these mechanisms is discussed in further detail below with reference to FIG. 3.

Figure 3:
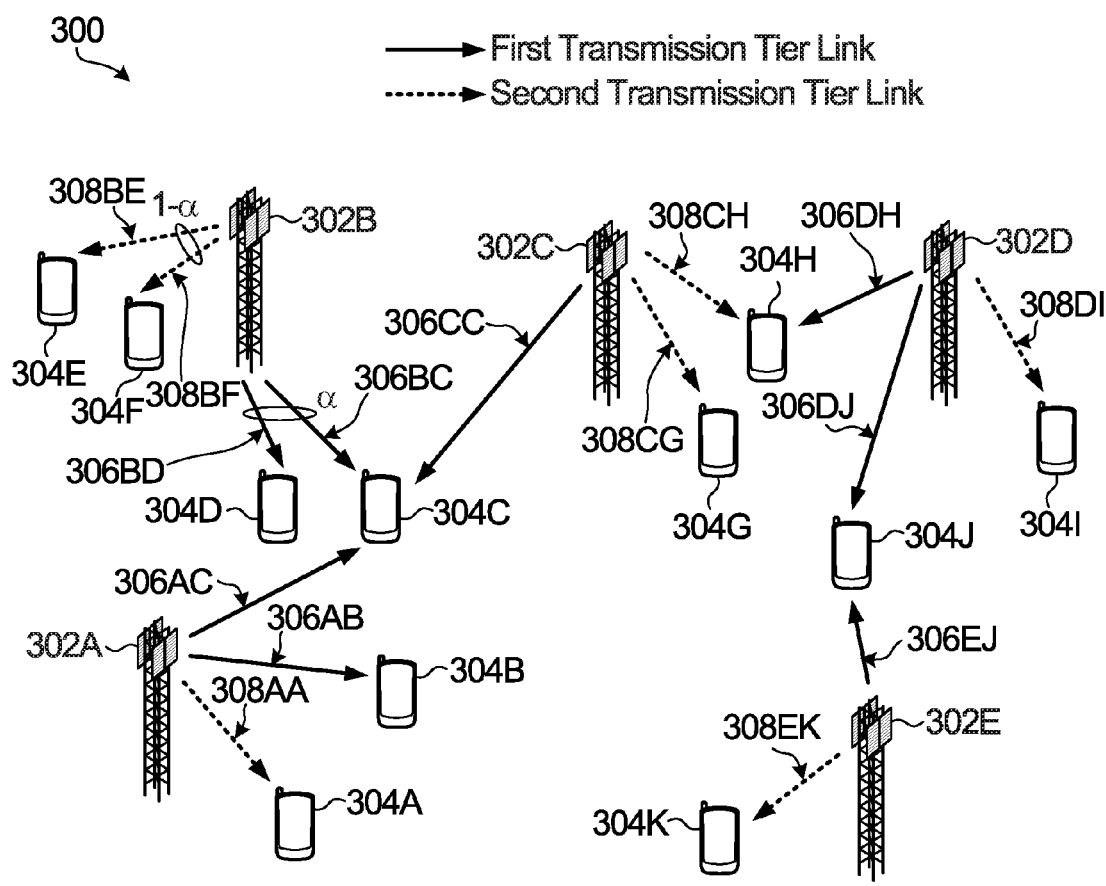
FIG. 3 is a block diagram illustrating a two-tier transmission scheme in a communication network according to example embodiments described herein.

FIG. 3 is a block diagram illustrating a two-tier transmission scheme in a communication network 300 according to example embodiments described herein.

The portion of the communication network 300 shown in FIG. 3 includes network nodes 302A, 302B, 302C, 302D, 302E and UEs 304A, 304B, 304C, 304D, 304E, 304F, 304G, 304H, 304I, 304J, 304K.

Network Signaling for UE Measurements

In embodiments of the present disclosure, at least a subset of the following network signaling is transmitted from the network to a UE for UE measurement purposes:

Information identifying pilot patterns transmitted from antenna port(s) of a network node. Alternatively, information identifying a pool of available pilot patterns may be sent to UEs statically or semi-statically, and a UE can use a blind detection algorithm to detect active pilot patterns from the known pool of available pilot patterns. At each pilot pattern transmission occasion, each antenna port transmits at most one pilot pattern sequence.

Information identifying a codebook or signature of every transmit layer in the first transmission tier.

Information identifying the modulation and coding scheme (MCS) of at least a subset of transmit layer in the first transmission tier, e.g. the network may provide a UE with information identifying the MCSs of transmit layers the network deems to be relevant to the UE.

Information identifying a power sharing factor between first transmission tier and second transmission tier transmit layers. If multiple transmit layers in the first transmission tier are sent from an antenna port, the transmit power of each transmit layer should be known at the UE. The transmit power values can be sent to the UE explicitly or the UE can use a detection algorithm to extract the transmit power of a transmit layer from a received signal.

Information associating transmit layers in the first transmission tier with pilot patterns. Multiple transmit layers may be associated with one pilot pattern. For example, an antenna port that transmits a pilot pattern may send more than one transmit layer in the first transmission tier.

Each of the network nodes 302 includes at least one antenna port used to transmit messages. In general, network nodes and antenna ports are transparent to UEs 304, meaning that UEs 304 are aware of the association between transmit layers in the first transmission tier and pilot patterns, but may not know the association between pilot patterns and the transmitting antenna ports of the network nodes 302. This is one implementation of no-cell technology that could be applicable to 5G communication networks.

The network signaling described above can be shared with UEs 304 statically or semi-statically. The network signaling may be broadcast or sent to particular UEs on an as needed basis.

Some parameter values may be common among all transmit layers. In such cases, transmission parameter values that are common to all transmit layers may be broadcast as system-level information. For example, in some embodiments system-level information may be broadcast to inform UEs 304 that there is only one transmit layer per pilot pattern in the first transmission tier and/or that a power sharing factor between first transmission tier and second transmission tier transmit layers that are associated with the same pilot pattern is the same for all pilot patterns.

In some embodiments, transmission parameter values may be different in different bandwidth (BW) regions or zones. The BW zones may be physical BW zones or logical BW zones. The decision on splitting a BW into different zones can be based on UE feedback or use application, for example. Further details regarding the zoning of a time-frequency resource space are discussed in further detail below with reference to FIGS. 5 to 10.

UE Measurement

After receiving pilot patterns from one or more of the network nodes 302, the following measurement steps are performed at a UE 304:

Estimate the channel associated with every dominant pilot pattern that the UE receives. A dominant pilot pattern is defined as a pilot pattern that is received with a signal strength that is at least as strong as a threshold value. For example, the UE 304C may receive pilot patterns from each of the network nodes 302, but only those pilot patterns received at UE 304C from network nodes 302A, 302B and 302C may have signal strengths above the threshold.

Provide a list of all jointly decodable transmit layers in the first transmission tier from all estimated channels. The jointly decodable transmit layers in the first transmission tier can be identified by a UE using the channel estimate, the MCS, and the transmit power associated with each transmit layer in the first transmission tier. The transmit power associated with a transmit layer in the first transmission tier can be obtained from a network node's total transmit power and a power sharing factor between the transmit layer in the first transmission tier and a transmit layer in the second transmission tier, for example. In the calculations associated with determining the joint decodability of transmit layers in the first transmission tier, transmit layers in the second transmission tier are treated as interference. The algorithm used at a UE 304 to determine the joint decodability of first transmission tier transmit layers is implementation specific and can be, for example, SIC, ML, or the approximate variations of ML such as MPA.

Calculate the effective channel, effective SINRs and/or effective spectral efficiency of transmit layers in the second transmission tier from all estimated channels. This is done knowing the channel estimate and the transmit power associated with the transmit layers in the second transmission tier. This calculation is done assuming that the interfering effect of jointly decodable layers in the first transmission tier are removed from the received signal. In some embodiments, unless a UE 304 is informed otherwise through network signaling, the UE assumes that there is only one layer per pilot pattern transmitted in the second transmission tier.

UE Feedback

Each UE 304 sends feedback information to the network based on the measurements made by the UE. The feedback information includes at least one of the two following sets of information:

The labels or indices of all jointly decodable transmit layers in the first transmission tier. There are some alternatives to this feedback. The feedback can also or instead include SINRs, quantized SINRs or quantized SINR differences (i.e., the difference between SINR and a decoding threshold) associated with different layers that are jointly decoded. This type of feedback is considered as soft information of jointly decodable layers, which a network node may use to adjust the network node's scheduling pool of UEs, e.g. adjusting the scheduling pool to allow UEs with SINRs slightly lower than the decoding threshold to be included in the scheduling pool. In another example, in some implementations the same MCS is used for all transmit layers in the first transmission tier and the same power sharing factor is used for all antenna ports. In such cases, rather than sending information identifying the indices of the jointly decodable transmit layers in the first transmission tier, UEs 304 can send information identifying the minimum power sharing factor required to decode L transmit layers in the first transmission tier, where L is an integer value known to the network nodes 302 and UEs 304.

CQIs, estimated spectral efficiency, preferred precoder (e.g. from a codebook of precoders), estimated channel matrix or any other CSI/CQI feedback associated with transmit layers in the second transmission tier. This type of feedback may be obtained based on the calculated SINR of the transmit layers, after decodable transmit layers from the first transmission tier are removed.

In some cases, the feedback information provided by a UE may be include multiple feedback sets specific to different zones of bandwidth. For example, sub-band or zone-specific feedback may be provided by a UE if the transmit parameters related to the first transmission tier, such as MCS, number of transmit layers, and power sharing factor, are different in different bandwidth zones.

If a part of the feedback information is deemed not required, it may be excluded from the feedback. For example, in some circumstances the SINRs of the second transmission tier transmit layers may indicate that the rate that could be obtained by transmitting data to UE 304F in the second transmission tier is much higher than the rate that could be obtained by transmitting data to UE 304F in first transmission tier transmit layers. In such circumstances, the labels of the decodable first transmission tier transmit layers may be omitted from the feedback information that UE 304F provides, because data transmission for UE 304F is likely to be scheduled in the second transmission tier. This scenario is more common for cell-center UEs. Conversely, in some circumstances the number of decodable transmit layers in the first transmission tier may indicate that the rate that could be obtained from data transmission to UE 304C in the first transmission tier is much higher than the rate that could be obtained from data transmission to UE 304C in the second transmission tier. In these circumstances, CQIs of transmit layers in the second transmission tier may be omitted from the feedback information that UE 304C provides, because data transmission for the UE is likely to be scheduled in the first transmission tier. This scenario is more common for cell-edge UEs.

If, for a given UE, the number of decodable first transmission tier transmit layers is too small (or zero) and the SINRs of the second transmission tier transmit layers are too low, so that the attainable rate from either of the two tiers is too small, the UE may be deemed inappropriate for scheduling and no feedback is sent.

Typically, if a first transmission tier transmit layer received from a network node is not decodable, a second transmission tier transmit layer from the same network node is also not decodable or only decodable if it utilizes a very low spectral efficiency, because a first transmission tier transmit layer is typically sent with a higher transmit power and a lower MCS than those of a second transmission tier transmit layer.

The decision on omitting a part of the feedback information may be made at a UE, or at a network node that then signals the decision to the UE.

Scheduling

Each of the network nodes 302 may schedule data transmissions for UEs 304 independently based on the feedback information provided by the UEs 304. For example, in some embodiments, if a network node receives feedback information from a UE for a pilot pattern transmitted by the network node, then the network node can enter the UE in a pool of scheduling candidates. A network node can drop a UE from the network node's pool of scheduling candidates due to, for example, network instructions or a poor predicted rate based on feedback information from the UE.

A UE may be scheduled for data transmission from multiple network nodes in the same time-frequency resource. For example, as depicted in FIG. 3, UE 304C is scheduled for data transmission from network nodes 302A, 302B and 302C. Each of the network nodes 302A, 302B and 302C may transmit data to UE 304C in the same time-frequency resource using different transmit layers in the first transmission tier. As a further example, UE 304H is scheduled for data transmission from network node 302C in the second transmission tier and scheduled for data transmission from network node 302D in the first transmission tier. Network nodes 302D and 302C may transmit data to UE 304H in the same time-frequency resource in the first and second transmission tiers, respectively.

At each network node, a performance measure, such as a weighted (sum) rate performance measure or any other criterion based on fairness, delay, total throughput, guaranteed QoS or bit rate, or a combination thereof, can be used to schedule UEs from the pool of scheduling candidates.

Each network node may schedule the first and second transmission tiers independently or jointly. For joint scheduling of the two transmission tiers, a performance measure is used to schedule UEs for data transmission from a common pool of scheduling candidates. As part of the scheduling process, each UE that is scheduled for data transmission is assigned to a transmission tier. For independent scheduling of the two transmission tiers, a network node creates separate pools of potential scheduling candidates for each transmission tier based on the network's own measurement or UEs' feedback. The network node then schedules data transmissions for UEs in each pool independently.

Regardless of how the scheduling is performed at a network node, each of the first and second transmission tiers is characterized by the MCS and the number of transmit layers in that tier. The second transmission tier transmit layers are adapted based on the CQI feedback with possibly some fine tuning link adaptation, e.g., outer loop link adaptation (OLLA). In contrast, the MCS of the first transmission tier transmit layers and the number of the first transmission tier transmit layers per antenna port are known a priori and only changed semi-statically.

As depicted in FIG. 3, each of the UEs 304 has a transmission link to one or more of the network nodes 302 in at least one of two transmission tiers. The network node 302A has transmission links 306AB and 306AC in the first transmission tier with UEs 304B and 304C, respectively, and a transmission link 308AA in the second transmission tier with UE 304A. The network node 302B has transmission links 306BC and 306BD in the first transmission tier with UEs 304C and 304D, respectively, and transmission links 308BE and 308BF in the second transmission tier with UEs 304E and 304F, respectively. The network node 302C has a transmission link 306CC in the first transmission tier with UE 304C. The network node 302D has transmission links 306DH and 306DJ in the first transmission tier with UEs 304H and 304J, respectively, and a transmission link 308DI in the second transmission tier with UE 304I. The network node 302E has a transmission link 306EJ in the first transmission tier with UE 304J and a transmission link 308EK in the second transmission tier with UE 304K. As noted above, a UE may be scheduled for data transmission in different transmission tiers by different network nodes. UE 304H is scheduled for data transmission in the first transmission tier by network node 302D, as indicated by the first transmission tier transmission link 306DH, and in the second transmission tier by network node 302C, as indicated by the second transmission tier transmission link 308CH, for example.

The transmission links 306 in the first transmission tier use a predefined modulation and coding that is known to the UEs and is semi-static, but may be changed over a time-frame of several seconds or minutes. If the predefined modulation and coding in the first transmission tier is reconfigured, then information regarding the reconfiguration is transmitted to the UEs by the network. The predefined modulation and coding in the first transmission tier may differ from network node to network node. Network nodes 302A and 302E may use different predefined modulation and coding schemes in the first transmission tier, for example.

The transmission links 308 in the second transmission tier use adaptive modulation and coding based at least in part on CQI feedback information from the UEs. For example, the modulation and coding scheme used in the second transmission tier transmission link 308DI between the network node 302D and UE 304I may be adapted at network node 302D based at least in part on CQI feedback information received from UE 304I. In some embodiments, adaptive modulation and coding in the second transmission tier is adapted based on the CQI feedback information (e.g., signal-to-interference-plus-noise ratio (SINR) in the second transmission tier). In these embodiments, outer-loop link adaptation (OLLA) is enabled. For example, adaptive modulation and coding in the second transmission tier may be adapted based on the CQI feedback information and information regarding transmission errors (e.g., packet error rates) and/or re-transmissions (e.g., packet re-transmission rates). In some embodiments, closed loop link adaptation is used in the second transmission tier. For example, adaptive modulation and coding in the second transmission tier may be based on SINR and some mode of Channel State Information (CSI) knowledge that is reported by the UE to the network node transmission point and used for closed loop transmission.

A network node that has scheduled a UE for data transmission in one of the two transmission tiers may transmit scheduling information to the UE. This scheduling information may include information identifying where data for the UE will be transmitted within one of the two transmission tiers. For example, the network node may transmit information identifying the resources (e.g., time slots, frequency bands) within a transmission tier that have been allocated to the UE. In other embodiments, a UE may not be informed of where data for the UE will be transmitted within a transmission tier, and therefore a UE may have to blindly detect its data.

The waveforms of communication signals in the first and second transmission tiers are implementation specific. In one example embodiment, sparse code multiple access (SCMA) waveforms and/or orthogonal frequency division multiple access (OFDMA) waveforms may be utilized in one or both of the transmission tiers. In one specific example embodiment, transmissions in the first transmission tier utilize SCMA waveforms and transmissions in the second transmission tier utilize OFDMA waveforms.

As noted above, transmissions for UEs may be multiplexed in the first transmission tier using layer-based multiplexing. UE 304C, for example, may receive and apply layer-based decoding to the first transmission tier communications signals that it receives from network nodes 302A, 302B, 302C via first transmission tier transmission links 306AC, 306BC and 306CC, respectively. For example, The UE 304C may estimate the channel or communication signal that is associated with each of the different layers, and attempt to jointly decode the data associated with the UE in the first transmission tier. As noted above, layers in the first transmission tier may be multiplexed in one or more domains. For layers multiplexed in a code domain (e.g., SCMA layers), the UEs receive a set of codebooks with corresponding pilot patterns for the predefined modulation and coding schemes that are used by the network nodes 302. For code domain layers, the UE 304C may use the layer codebooks to decode the received communication signals in the first transmission tier, treating received communication signals in the second transmission tier as interference, and may discard the communication signals associated with any layers in the first transmission tier that have not been allocated to it. In some embodiments, a network node that has scheduled a UE for data transmission in the first transmission tier transmits information to the UE regarding a number of layers, and indices of those layers, in the first transmission tier that are allocated to the UE.

The codebooks for different layers in the first transmission tier could be allocated and distributed to UEs by a centralized processing system (not shown) via signaling from one or more of the network nodes, for example. Multiple layers may share the same pilot sequence set and originate from the same physical/logical antenna port in some embodiments.

The network nodes 302 transmit data to the UEs 304 independently or with some limited coordination among network nodes. For example, where multiple network nodes schedule transmissions for a UE in the first transmission tier, each network node that has scheduled a transmission for the UE in the first transmission tier may transmit an independent data stream that is not shared with any other network node serving the UE. In other embodiments, each network node serving a UE may transmit a portion of the data belonging to a shared data flow. In still other embodiments, each network node serving a UE may transmit a fountain coded stream from a common data flow shared among at least one other network node serving the UE. For example, in the illustrated embodiment, UE 304C has three serving network nodes 302A, 302B, 302C that have scheduled UE 304C for data transmission in the first transmission tier. Each of the network nodes 302A, 302B, 302C may transmit an independent data stream, a respective portion of a shared data flow, or a fountain code stream from a common data flow shared among at least one of the other network nodes serving the UE 304C.

Each of the network nodes 302 may have a total transmission power level that is shared between the two transmission tiers. The total transmission power level may be different for different network nodes. Different network nodes may share their respective total transmission power level between the two transmission tiers differently. In one embodiment, a network node shares its total transmission power level between the two transmission tiers according to a power sharing factor $\alpha$. In particular, the total transmission power level may be shared such that a ratio of a first transmission power level in the first transmission tier to the total transmission power level is given by $\alpha$ and a ratio of a second transmission power level in the second transmission tier to the total transmission power level is given by $1-\alpha$.

In many cases, the power sharing factor $\alpha$ is configured so that $\alpha \geq 0.5$, which means that more of the total transmission power level is allocated to the first transmission tier, which is more likely to serve cell-edge UEs, than to the second transmission tier, which is more likely to serve cell-center UEs. In some embodiments, the power sharing factor $\alpha$ is pre-configured and fixed, whereas in other embodiments $\alpha$ may be semi-static and reconfigurable, similar to the pre-defined modulation and coding in the first transmission tier. In either case, the value of the power sharing factor $\alpha$ may be selected from a pre-defined set of values.

In some embodiments, information regarding the power sharing factor $\alpha$ for a network node is transmitted to UEs. In other embodiments, a UE may blindly detect the power sharing factor $\alpha$ of the network node(s) in its vicinity.

In some embodiments, a UE may utilize its knowledge of $\alpha$ for channel estimation and/or interference estimation. With respect to channel estimation, in some cases a network node may be configured such that its demodulation reference signal (DMRS) ports or channel state information reference signal (CSI-RS) ports associated with the first and second transmission tiers are shared. In such cases, a UE that is aware of $\alpha$ for the network node may measure the channel for one port, then infer the channel for transmit layers of the first transmission tier by applying $\sqrt{\alpha}$ to the channel measurement and infer the channel for transmit layers of the second transmission tier by applying $\sqrt{1-\alpha}$ to the channel measurement. With respect to interference estimation, a UE may use the value for $\alpha$ to estimate the background interference to the first transmission tier caused by the second transmission tier by measuring the received power in the first transmission tier and deducing the interference based on the measured received power in the first transmission tier and the knowledge that the total transmission power level is shared between the two transmission tiers according to $\alpha$.

In some embodiments, the power sharing factor $\alpha$ of a network node may be determined based on a predefined modulation and coding scheme that the network node is configured to use in the first transmission tier, because both $\alpha$ and the modulation and coding scheme affect whether communication signals in the first transmission tier can be detected, treating communication signals in the second transmission tier as interference.

In some cases, the power sharing factor $\alpha$ for a network node may be configured so that a communication signal in the first transmission tier with a predefined modulation and coding scheme is likely to be decodable by at least a threshold portion of UEs in the vicinity of the network node. For example, the power sharing factor $\alpha$ for a network node or a group of network nodes may be based on a long-term SINR distribution of UEs in the vicinity of the network node(s). In one embodiment, given a certain threshold t, the value of the power sharing factor $\alpha$ is determined according to:

$$\alpha = \left(1 + \frac{1}{G(t)}\right)(1 - 2^{-SE_1}) \quad (1)$$

where G(t) denotes the threshold compared to which t % of UEs have a long-term SINR higher than the threshold and $SE_1$ denotes the spectral efficiency of the first transmission tier communication signal. In some cases, the value for $\alpha$ determined according to equation (1) may be adjusted to increase or decrease the value for $\alpha$ in an effort to increase or decrease the likelihood that UEs are able to decode communication signals in the first transmission tier. Increasing the value for $\alpha$, thus increasing the transmission power level in the first transmission tier, increases the coverage area in which a network node could potentially serve UEs in the first transmission tier. Conversely, decreasing the value for $\alpha$ decreases a network node's coverage area for the first transmission tier. A network node may initially increase the value for $\alpha$ to increase the likelihood that more UEs are able to be served by the network node in the first transmission tier. However, if the network node becomes heavily loaded in the first transmission tier, the network node may decrease the value for $\alpha$ in an effort to reduce the number of UEs that the network node serves in the first transmission tier. In some cases, the adjustment in $\alpha$ may be done in coordination with one or more neighboring network nodes for load-balancing purposes. For example, if a network node is heavily loaded in the first transmission tier and a neighboring network node is lightly loaded in the first transmission tier, the heavily loaded network node may decrease its value for $\alpha$ and the lightly loaded network node may increase its value for $\alpha$.

A UE having at least one scheduled transmission in at least one of the two transmission tiers receives transmissions in at least one of the two transmission tiers. From the received transmissions, the UE tries to jointly detect transmissions in the first transmission tier from network node(s) in its vicinity using the predefined modulation and coding of the network node(s) in the first transmission tier, treating transmissions in the second transmission tier as interference.

A UE scheduled for data transmission in the first transmission tier jointly detects transmissions for the UE from a set of at least one network node jointly with transmissions for other UEs from the set of at least one network node. The UE may select a transmit layer in the first transmission tier based on a received signal strength of a pilot pattern associated with the transmission layer.

Transmissions in the first transmission tier may act as interference to transmissions in the second transmission tier. A UE that has a transmission scheduled in the second transmission tier may attempt to increase the likelihood of being able to detect its scheduled transmission in the second transmission tier by jointly detecting interfering transmissions in the first transmission tier, and subtracting the jointly detected transmissions in the first transmission tier from the received transmissions. The UE may jointly or successively attempt to detect its scheduled transmission in the second transmission tier from a remainder of the received transmissions remaining after the subtraction of the jointly detected transmissions in the first transmission tier.

In general, a UE attempts to jointly detect and subtract enough transmissions in the first transmission tier to be able to detect its scheduled transmission in the second transmission tier. In some embodiments, a UE may attempt to jointly detect and subtract as many transmissions in the first transmission tier as possible in order to maximize the likelihood of being able to detect it scheduled transmission in the second transmission tier. In some embodiments this may be an iterative process. For example, if the UE is unable to detect its scheduled transmission in the second transmission tier, the UE may attempt to jointly detect and subtract more transmissions in the first transmission tier in order to try to improve the SINR for its scheduled transmission in the second transmission tier. The UE may then again try to detect its scheduled transmission in the second transmission tier. For example, a UE that has a transmission scheduled in the second transmission tier may initially try to jointly detect transmissions in the first transmission tier that are associated with the same pilot pattern or the same network node that has a transmission scheduled for the UE in the second transmission tier. If the UE is unable to detect its scheduled transmission in the second transmission tier after having jointly detected and subtracted transmissions in the first transmission tier that are from the network node that has a transmission scheduled for the UE in the second transmission tier, then the UE may try to jointly detect transmissions in the first transmission tier that are associated with different pilot patterns or other network nodes in its vicinity. In some embodiments, subtracting the jointly detected transmissions in the first transmission tier from the received transmissions is done using successive interference cancellation.

In most cases, the more first transmission tier transmissions that a UE is able to detect and subtract, the greater the chance that the UE will be able to detect its data in the second transmission tier. Therefore, in some embodiments a UE that has a transmission scheduled in the second transmission tier is configured to try to jointly detect and subtract as many first transmission tier transmissions as possible in order to increase the SINR of its scheduled transmission in the second transmission tier. This may be advantageous from a throughput perspective because a UE that removes more interference from the first transmission tier may be able to detect a higher order MCS in the second transmission tier.

Feedback Adjustment

As noted above, each of the network nodes 302 schedules data transmissions for UEs 304 independently based on the feedback information provided by the UEs 304. A UE may be scheduled from multiple network nodes in the same time-frequency resource. This means that a UE may receive multiple transmit layers from different network nodes. This is more likely to happen for UEs that are scheduled for data transmission using the first transmission tier transmit layers. For example, as depicted in FIG. 3, UE 304C is scheduled by network nodes 302A, 302B and 302C in the first transmission tier and has respective first transmission tier transmit links 306AC, 306BC and 306CC with those network nodes.

The first transmission tier transmit layers are typically lower rate and are typically used to provide service to cell-edge UEs. Cell-edge UEs typically receive comparable signal strengths from multiple network nodes and have a higher chance of having data transmissions scheduled by more than one network node.

If multiple network nodes schedule data transmissions for UEs in the same time-frequency resource, the resulting rate received by the UE may be higher than the rate predicted by the feedback that the UE provided. Therefore, in some embodiments UE feedback may be adjusted at the network nodes based on the difference between the predicted and actual rates received by a UE. This can be done using some signaling from a central coordinator or feedback from a UE.

For example, in some embodiments, a UE sends additional feedback information identifying the average number of transmit layers (of each transmission tier) the UE has recently received at each scheduling interval. If there is a discrepancy between a predicted number of transmit layers that the UE was expected to be able to receive based on the feedback information that it provided and the average number of transmit layers that the UE actually received, then the feedback information going forward may be adjusted based on the discrepancy. In other embodiments, a central coordinator (not shown) instructs the feedback adjustment based on the recent average rate of the UE and the number of scheduling occasion of the UE. Using the above information, the total rate for the UE at the next scheduling occasion can be predicted. In both scenarios, scheduling data transmission for the UE is then based on adjusted feedback information.

ACK/NACK

In some embodiments, Acknowledgement/Negative Acknowledgement (ACK/NACK) mechanisms are provided for independently-coded packets in the first and second transmission tiers.

Fast link adaptation, such as OLLA, is not used for first transmission tier transmit layers. The number of scheduled first transmission tier transmit layers may be reduced if a UE sends a NACK message.

In the second transmission tier, a hybrid automatic repeat request (HARQ) mechanism and/or an OLLA mechanism may be triggered by ACK/NACK. In some embodiments, if a NACK message is received for a packet that was previously transmitted in a first transmission tier transmit layer, the packet may be resent in a second transmission tier transmit layer. Similarly, if a NACK message is received for a packet that was previously transmitted in a second transmission tier transmit layer, the packet may be resent in a first transmission tier transmit layer. However, in this latter scenario, in some embodiments the packet may only be resent in a first transmission tier transmit layer if a determined resend rate in the second transmission tier is below a threshold. If a packet is split to multiple transmit layers, each transmit layer may have its own ACK/NACK.

Network-Wide Planning

Pilot Patterns

In some embodiments, network nodes 302 may be configured so that neighboring antenna ports (from the same network node or neighboring network nodes) transmit pilot patterns in orthogonal time-frequency (TF) resources. This is done so that each UE receives pilot patterns from the network nodes of the UE's potential serving set network nodes in clean channels. In some embodiments, the potential serving set network nodes of a UE include those network nodes for which the received pilot pattern power at the UE is above a certain threshold, e.g. those network nodes from which the UE has received a dominant pilot pattern.

In other embodiments, low correlation pilot pattern design in neighboring network nodes is used as an alternative to orthogonal pilot patterns. This increases the number of potential pilot patterns, but comes at the possible cost of interference between neighboring network nodes.

First Transmission Tier Codebooks/Signatures

In many embodiments, codebooks/signatures of transmit layers sent from the same antenna port or different antenna ports on the same network node are configured so that they are orthogonal. This is done so that transmit layers are separable in the code domain.

However, in some embodiments, codebooks/signatures of transmit layers sent from two different network nodes or even from the same antenna port or different antenna ports on the same network node may not be orthogonal and may collide. This collision may not be problematic as long as UEs receive the transmit layers through different channels and/or the codebooks/signatures of the transmit layers are different but not necessarily orthogonal, so the transmit layers can be separated by usage of linear or non-linear joint reception techniques. For example, a message passing algorithm (MPA) may be used in some embodiments to detect multiple non-orthogonal codebooks/signatures.

Timing

In some embodiments, transmissions from network nodes 304 are timed so that signals of the same subframe from potential serving set network nodes are received at each UE within a cyclic prefix (CP). Alternatively, a time correction mechanism may be used at a UE.

Throughput and coverage were simulated for example scenarios of CoMP transmission according to an embodiment of the two-tier communication signaling approach to scheduling and transmission for distributed open-loop multi-user CoMP disclosed herein. In this embodiment, a first transmission tier uses SCMA waveforms and a second transmission tier uses OFDMA waveforms. Other parameters of this embodiment that were used for simulation purposes are summarized below:

Two Tiers of Transmission
  First Transmission Tier: SCMA, fixed MCS, fixed number of SCMA layers, and pre-defined SCMA codebooks/signatures.
  Second Transmission Tier: OFDMA with variable MCS.
Power Sharing Between Two Tiers
  Power sharing between the two tiers is in accordance with a power sharing factor α as discussed previously.
Scheduling at TPs
  From a pool of UEs that have indicated that they are able to decode SCMA layers in the first transmission tier from a network node or transmit point (TP), the TP schedules transmissions to two UEs with proportional fairness (PF) criteria independently in the two transmission tiers. For example, one UE has a transmission scheduled in the second transmission tier using MCS adapted to CQI feedback, and OLLA enabled, and one UE has a transmission scheduled in the first transmission tier using fixed MCS and a fixed number of layers per link (i.e. fixed rate) with OLLA disabled. In this embodiment, the scheduling decision at each TP is independent of scheduling at other TPs. As a result, a UE can use CoMP as long as it is scheduled by multiple TPs.

Detection at UEs

For a UE that has a transmission scheduled in the first transmission tier (SCMA tier):
  The UE uses joint/SIC detection to detect as many first transmission tier links (SCMA links) as the UE can using MPA (treating second transmission tier links (OFDMA links) as interference), even though some first transmission tier links are not allocated to the UE. The UE retains its own data in the detected first transmission tier links and discards the rest.

For a UE that has a transmission scheduled in the second transmission tier (OFDMA tier):
  The UE first utilizes joint/SIC detection to detect as many first transmission tier SCMA links as the UE can using MPA (treating second transmission tier OFDMA links as interference). The UE then uses SIC to remove the detected first transmission tier links and detect its own data in the second transmission tier.

Table 1 below includes a summary of the simulated throughput and coverage for joint receivers and SIC receivers in simulation scenarios that include 1 to 3 joint TPs and different combinations of SCMA rate per link and power sharing factor α.

TABLE 1

| Max. No. Joint TPs | SCMA Rate per Link, R, same for all TPs | SCMA Alpha (α) | Joint Receiver | | SIC Receiver | |
|---|---|---|---|---|---|---|
| | | | TPUT (Mbps) | Cov. (kbps) | TPUT (Mbps) | Cov. (kbps) |
| 1 | | 0 (OFDMA baseline) | 19.06 | 473.57 | 19.06 | 473.57 |
| 1 | 0.5789 | 0.8 | 19.13 | 577.45 | 19.13 | 577.45 |
| 2 | 0.5789 | 0.8 | 19.97 | 916.76 | 19.95 | 905.48 |
| 3 | 0.5789 | 0.8 | 20.92 | 1024.70 | 20.89 | 1006.30 |
| 2 | 0.5789 | 0.7 | 21.33 | 909.80 | 21.29 | 898.21 |
| 3 | 0.5789 | 0.7 | 21.74 | 1000.30 | 21.74 | 974.15 |
| 1 | 0.8118 | 0.8 | 21.35 | 535.58 | 21.35 | 535.58 |
| 2 | 0.8118 | 0.8 | 21.87 | 874.22 | 21.86 | 858.59 |
| 3 | 0.8118 | 0.8 | 22.47 | 968.55 | 22.45 | 959.29 |

Figure 4A:
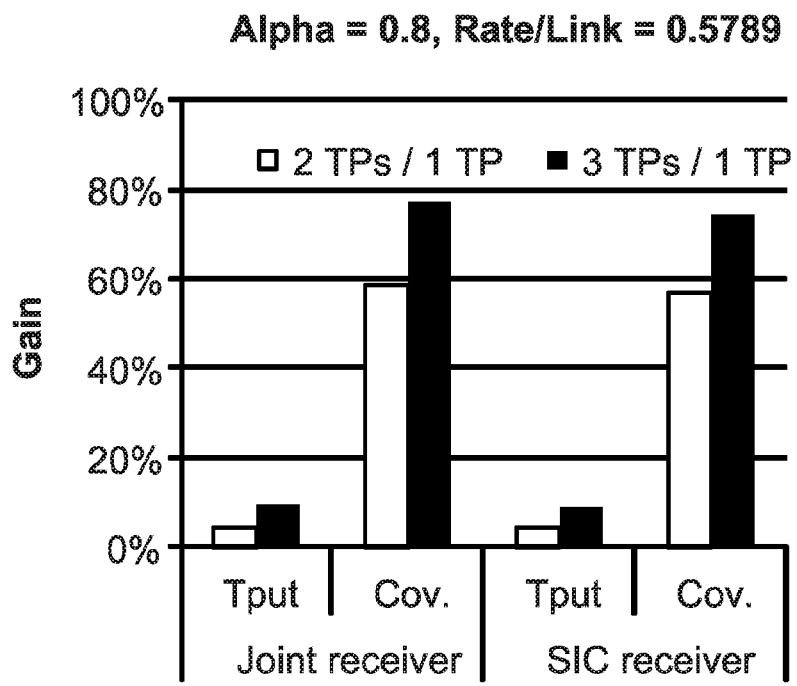
FIGS. 4A-4C illustrate simulated gains in throughput and coverage for example scenarios of CoMP transmission according to example embodiments described herein.
Figure 4B:
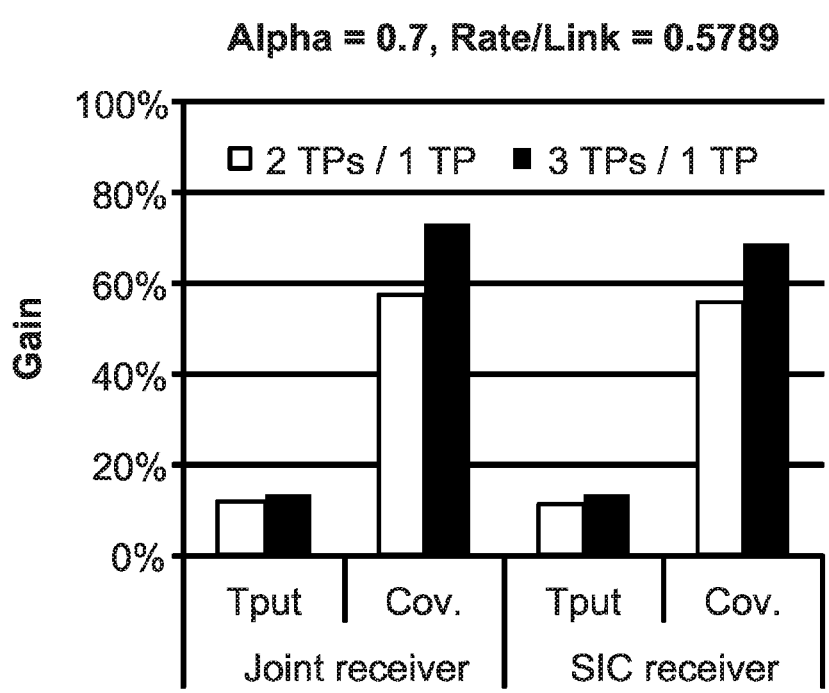
Figure 4C:
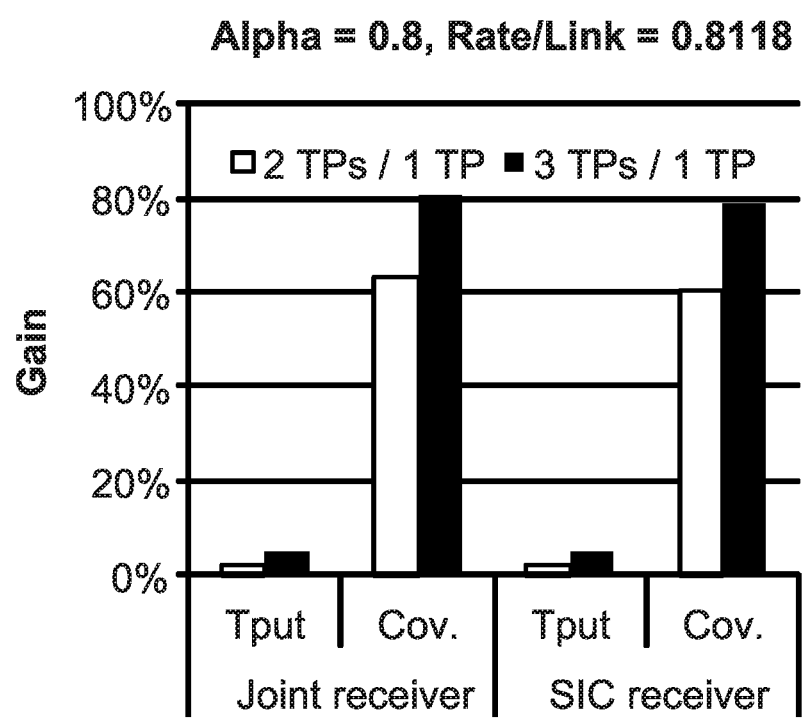

FIGS. 4A-4C illustrate the simulated gains in throughput and coverage for the example scenarios summarized in Table 1. As demonstrated by the simulation results, the distributed scheduling scheme of this embodiment provides coverage gain as the number of allowed joint TPs increases. The results also demonstrate that throughput and coverage can be adjusted based on the power sharing factor α and the SCMA rate per link.

FIGS. 4A-4C illustrate examples of the dependence of throughput and coverage on transmission power level and the modulation and coding scheme (reflected in the rate per link) used in the first transmission tier. The number of layers used in the first transmission tier is another example of a transmission parameter that affects system performance. In general, transmitting in the first transmission tier with a lower transmission power level, a higher order MCS and/or more layers provides a higher throughput, but lower coverage. Conversely, transmitting in the first transmission tier with a higher transmission power level, a lower order MCS and/or fewer layers provides a lower throughput, but higher coverage. Using one set of parameters throughout the first transmission tier for transmitting to all UEs may be non-optimal. For example, if a single MCS is used in the first transmission tier and some UEs are able to decode a higher order MCS than the one currently being employed in the first transmission tier, then system performance may be improved if transmissions to such UEs could be made in the first transmission tier using the higher order MCS.

In some embodiments, a network node may use multiple sets of first transmission tier transmission parameters in multiple zones of time-frequency resources in the first transmission tier. This provides more flexibility in selecting first transmission tier transmission parameters to fit UE conditions, thereby potentially improving overall system performance.

In some embodiments, the first transmission tier may be zoned according to a zone pattern. That is, two or more non-overlapping zones of time-frequency resources may be defined in the first transmission tier. The zones may be defined in terms of time resources, frequency resources or both time and frequency resources. The time-frequency resources for a zone may be a contiguous localized block of time-frequency resources and/or may include non-contiguous distributed blocks of time-frequency resources. Multiple sets of first transmission tier transmission parameters may be defined and associated with zones in the first transmission tier. The set of first transmission tier transmission parameters associated with a zone may include a predefined MCS that is to be used in a zone, a transmission power level that is to be used in a zone (e.g., expressed in terms of a zone-specific power sharing factor azone) and/or a number of layers to be used in a zone, for example. In such embodiments, transmissions within a zone in the first transmission tier are made in accordance with the set of first transmission tier transmission parameters associated with the zone.

In some embodiments, time-frequency resources in the first transmission tier are divided in time, frequency, or time and frequency to define different zones in the first transmission tier. In most cases, zone boundaries are defined to respect a standard granularity, e.g. resource blocks (RBs), transmission time intervals (TTIs). Different zones can be of different sizes in terms of time resources and/or frequency resources.

In some embodiments, zones are defined according to a certain rule, e.g. a time-frequency resource space may be divided into two zones, each with half the available bandwidth. The zone resources can be defined in logical resources, which can be mapped to physical resources, e.g. localized or contiguous time-frequency resources and/or distributed or non-contiguous time-frequency resources.

Figure 5A:
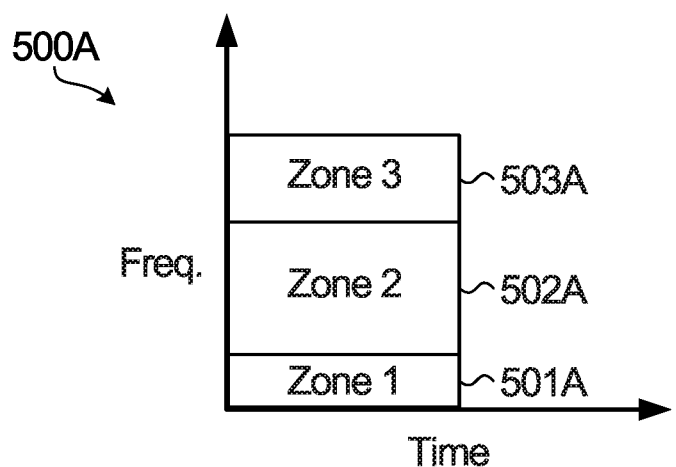
FIGS. 5A-5C illustrate examples of zone patterns in time-frequency resources where zones are defined in localized resources according to example embodiments described herein.
Figure 5B:
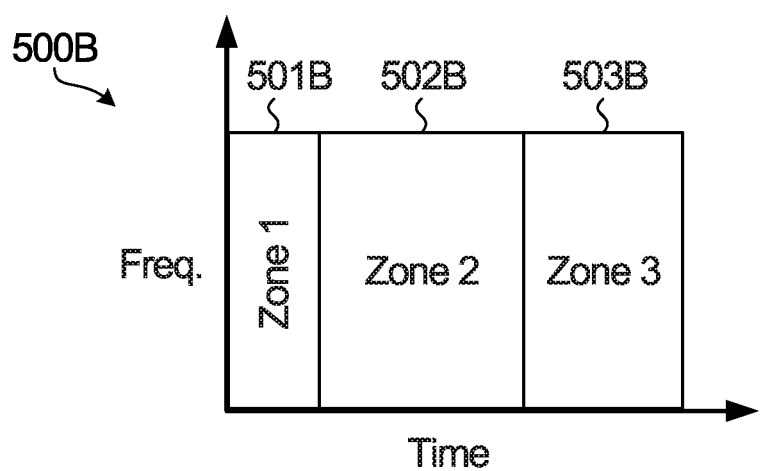
Figure 5C:
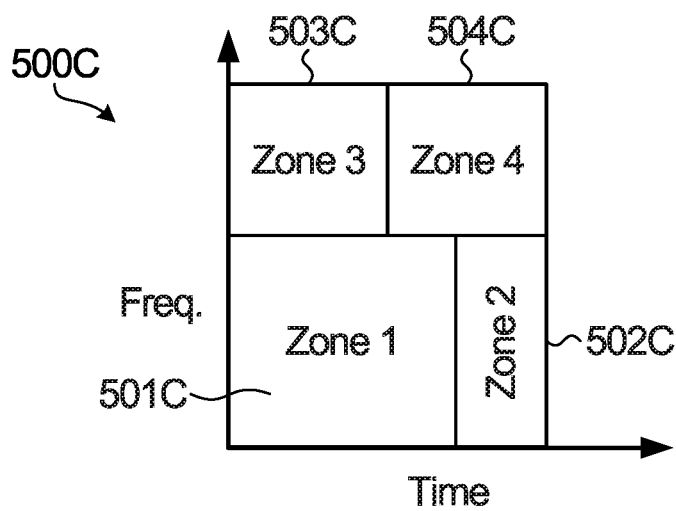

FIGS. 5A-5C illustrate examples of zone patterns in time-frequency resources in which zones are defined in localized time-frequency resources according to example embodiments described herein. FIG. 5A illustrates an example zone pattern 500A in which time-frequency resources are partitioned into three zones, namely Zone 1, Zone 2 and Zone 3, by frequency partitioning such that Zone 1 includes localized time-frequency resources 501A, Zone 2 includes localized time-frequency resources 502A, and Zone 3 includes localized time-frequency resources 503A. FIG. 5B illustrates an example zone pattern 500B in which time-frequency resources are partitioned into three zones, namely Zone 1, Zone 2 and Zone 3, by time partitioning such that Zone 1 includes localized time-frequency resources 501B, Zone 2 includes localized time-frequency resources 502B, and Zone 3 includes localized time-frequency resources 503B. FIG. 5C illustrates an example zone pattern 500C in which time-frequency resources are partitioned into four zones, namely Zone 1, Zone 2, Zone 3 and Zone 4, by time and frequency partitioning such that Zone 1 includes localized time-frequency resources 501C, Zone 2 includes localized time-frequency resources 502C, Zone 3 includes localized time-frequency resources 503C and Zone 4 includes localized time-frequency resources 504C.

Figure 6A:
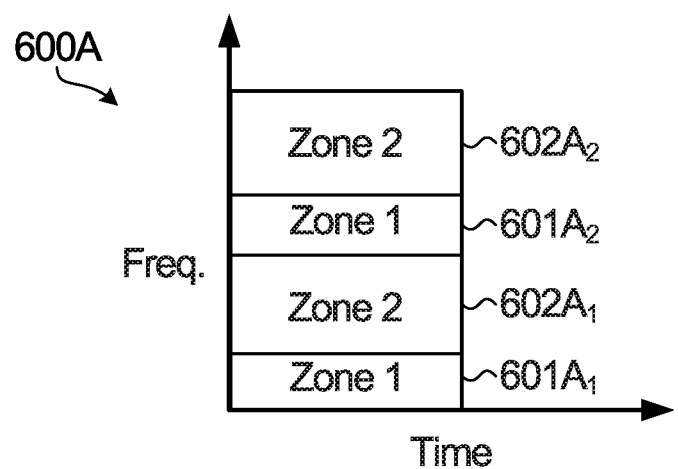
FIGS. 6A-6C illustrate examples of zone patterns in time-frequency resources where zones are defined in distributed resources according to example embodiments described herein.
Figure 6B:
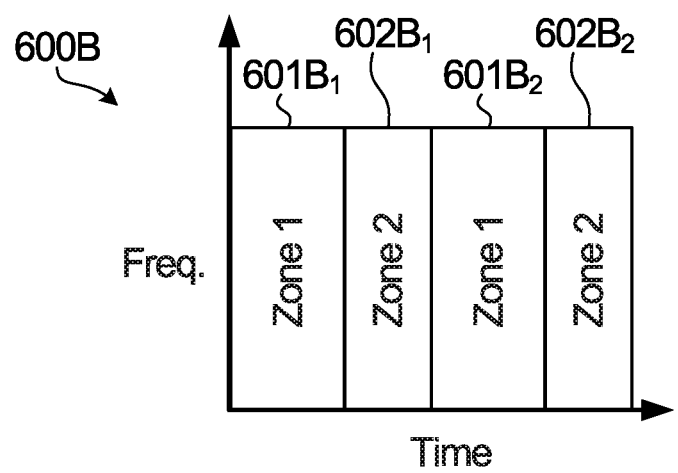
Figure 6C:
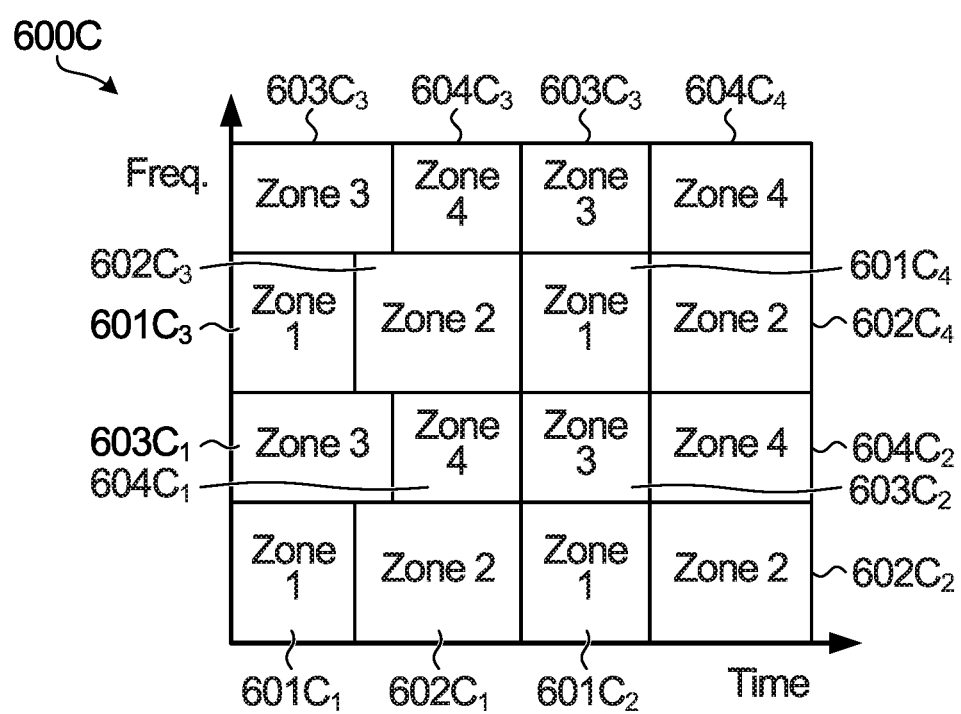

FIGS. 6A-6C illustrate examples of zone patterns in time-frequency resources in which zones are defined in distributed time-frequency resources according to example embodiments described herein. FIG. 6A illustrates an example zone pattern 600A in which time-frequency resources are partitioned into two zones, namely Zone 1 and Zone 2, by frequency partitioning such that Zone 1 includes distributed time-frequency resources $601A_1$ and $601A_2$, and Zone 2 includes distributed time-frequency resources $602A_1$ and $602A_2$. FIG. 6B illustrates an example zone pattern 600B in which time-frequency resources are partitioned into two zones, namely Zone 1 and Zone 2, by time partitioning such that Zone 1 includes distributed time-frequency resources $601B_1$ and $601B_2$, and Zone 2 includes distributed time-frequency resources $602B_1$ and $602B_2$. FIG. 6C illustrates an example zone pattern 600C in which time-frequency resources are partitioned into four zones, namely Zone 1, Zone 2, Zone 3 and Zone 4, by time and frequency partitioning such that Zone 1 includes distributed time-frequency resources $601C_1$, $601C_2$, $601C_3$ and $601C_4$, Zone 2 includes distributed time-frequency resources $602C_1$, $602C_2$, $602C_3$ and $602C_4$, Zone 3 includes distributed time-frequency resources $603C_1$, $603C_2$, $603C_3$ and $603C_4$ and Zone 4 includes distributed time-frequency resources $604C_1$, $604C_2$, $604C_3$ and $604C_4$.

In some embodiments, multiple sets of first transmission tier transmission parameters are defined. Each set of parameters may be associated with a pilot sequence. In such embodiments, a network node that is using a set of parameters transmits the pilot sequence that is associated with that set of parameters.

The number of sets of first transmission tier transmission parameters may be determined based on a criterion, such as the number of UE groups or the number of network node groups.

In some embodiments, UEs are grouped based on a criterion. For example, UEs may be grouped based on the size of the UE's potential serving set of network nodes, e.g., one group of UEs may include UEs having a potential serving set of size 2 and another group of UEs may include UEs having a potential serving set of size 3. In some embodiments, the number of sets of first transmission tier transmission parameters is based on the number of UE groups. For example, in some embodiments, the number of sets of first transmission tier transmission parameters is equal to the number of UE groups. In other embodiments, the number of sets of first transmission tier transmission parameters is equal to the number of UE groups that include at least a threshold number or percentage of UEs.

In some embodiments, network nodes are grouped based on a criterion, such as their network node or transmit point identification (TP ID). For example, in some embodiments, network nodes with the same mod(TP ID, # of TP groups) are grouped together, where TP ID is a network node's network node identification, # of TP groups is the total number of network node groups and mod( ) is the modulo function. In some embodiments, the number of sets of first transmission tier transmission parameters is equal to the number of network node groups.

A larger number of first transmission tier transmission parameter sets may provide more flexibility to serve the needs of different groups of UEs with different channel conditions, but may involve more signaling overhead. A smaller number of first transmission tier transmission parameter sets may be less flexible in terms of serving the needs of different groups of UEs with different channel conditions, but may provide most of the potential gains associated with zone in the first transmission tier, while having lower signaling overhead.

In each first transmission tier parameter set, parameters may be determined based on a criterion and/or objective. For example, the parameters may be selected based on an objective such as improving throughput, e.g. lower power sharing factor $\alpha$ and/or higher MCS, or improving coverage, e.g., higher power sharing factor $\alpha$ and/or lower MCS. In some embodiments, the parameters may be determined based on capacity-based calculations, statistics on joint decodability feedback, or some combination of the two, i.e. start by using capacity-based parameters, then revise the parameters when feedback becomes available. The capacity-based calculations may use Multiple Access Capacity (MAC) region equations and be based on long-term information, such as UE-to-TP path loss. The statistics on joint decodability feedback may be based on short-term fading information, for example.

Each zone in the first transmission tier corresponds to one set of first transmission tier transmission parameters. The association between zones and transmission parameter sets may be based on a criterion, such as a quality of service (QoS) requirement. For example, to satisfy a QoS requirement related to throughput, a larger zone in the first transmission tier may be associated with a parameter set that gives high throughput, e.g. lower power sharing factor $\alpha$ and/or higher MCS. To satisfy a QoS requirement related to coverage, a larger zone in the first transmission tier may be associated with a parameter set that gives high coverage, e.g., higher power sharing factor $\alpha$ and/or lower MCS. To satisfy a QoS requirement related to a delay constraint, a larger zone in the first transmission tier may be associated with a parameter set that gives low packet delay. In general, when a network node is less loaded the network node is able to provide a lower packet delay for UEs served by the network node than when the network node is more heavily loaded. In some embodiments, the association between zones and transmission parameter sets may be based on network information, such as UE grouping statistics. For example, if the percentage of UEs having a potential serving set of size 2 (Group A UEs) is larger than that of the percentage of UEs having a potential serving set of size 3 (Group B UEs), then a larger zone may be associated with a parameter set suited for Group A.

In some embodiments, the association of the zones and the first transmission tier transmission parameter sets is done semi-statically. In other embodiments, the association may be dynamic. Semi-static association requires less signaling overhead, and allows the parameters and/or zone pattern to be changed over a timeframe of several seconds or minutes. Dynamic association requires more signaling overhead, and allows the parameters and/or zone pattern to be changed more frequently to account for short term condition changes.

In some embodiments, the same zone pattern may be used by all network nodes. Different network nodes using the same zone pattern may use the same or different first transmission tier parameter sets in the same zone. The zone pattern may be static or may be changed semi-statically or dynamically. A semi-static assignment of the zone pattern requires lower signaling overhead relative to the dynamic assignment, but is less flexible to adapt to changes to an individual network node's operating conditions, such as changing traffic load.

In some embodiments, different network nodes may use different zone patterns. For example, in one embodiment each network node may adjust its zone pattern according to its own operational need. This means that a network node may have one or more zones that partially overlap one or more zones of another network node. The first transmission tier parameter sets used by network nodes for these over-lapped zones can be the same or different. The zone pattern used by a network node may be static or may be changed semi-statically or dynamically. Using different zone patterns in different network nodes requires higher signaling overhead relative to using a common zone pattern.

In some embodiments, the same zone pattern is used by a group of network nodes (e.g., a group of network nodes located within a geographic area), but different clusters of network nodes can have different zone patterns. The grouping of network nodes may be semi-static or dynamic.

In some embodiments, a network node's zone pattern and associated parameter sets can be adjusted based on a criterion, requirement or scenario and information such as UE feedback, prediction, or some (short/long-term) statistics. For example, the zone pattern and/or associated parameter sets may be adjusted based on decodability feedback for a given zone, e.g., if less than a threshold number of UEs can decode a number of first transmission tier links in a particular zone (a high interference scenario), then the MCS may be reduced in that zone. In another scenario, if a group of priority UEs requires high MCS (a high load scenario) and can decode it, then the MCS and zone size of a zone may be increased, so that the priority UEs are more likely to be scheduled in that zone. A priority UE may be any UE having strict QoS requirements that the network is aware of, e.g., a UE that needs to download large files or requires real-time video streaming with stringent delay constraints. When two conflicting requirements must both be considered, it may be possible to optimize the zone parameters/pattern based on the two conflicting requirements (e.g. high interference scenario vs. high load scenario), by assigning different pricing factors for the two conflicting requirements.

Zone patterns and associated parameter sets can be adjusted in a distributed or centralized manner. In the case of distributed adjustment, each network node adjusts its own zone pattern and the associated parameter sets independently. In the case of centralized adjustment, the zone adjustment between network nodes can be done in a centralized manner for only network nodes in a cluster or for network-wide network nodes. In some embodiments there may be negotiation exchanges between network nodes, e.g., network nodes may exchange their load requirement and/or interference information with each other.

In some embodiments, a zone pattern and/or associated parameter sets may be adjusted for load balancing purposes. For example, the zone pattern and/or associated parameter sets may be adjusted to adjust a network node's coverage area. By increasing the MCS of a zone for a network node, the coverage area of the network node can be reduced, because fewer UEs can decode data from the network node. The opposite is also true; by decreasing the MCS, the coverage area of the network node can be increased, because more UEs may be able to decode data from the network node. Hence, a network node with high load may off-load to neighboring network nodes by adjusting its zone pattern and/or associated parameter sets to reduce its coverage area. One or more of the neighboring network nodes that is only lightly loaded may adjust its zone pattern and/or associated parameter sets to increase its coverage area.

Signaling overhead associated with using zones in the first transmission tier includes signaling information regarding the multiple sets of first transmission tier transmission parameters, information regarding the zone patterns in time-frequency resources, information regarding the association of zones to sets of first transmission tier parameters, and information used in negotiation in zoning adjustment.

With respect to the information regarding the multiple sets of first transmission tier transmission parameters, a pool of parameter sets can be predefined and may be referred to by indices. New parameter sets can be added and broadcast to UEs.

The information regarding the zone patterns in time-frequency resources identifies zone boundaries/patterns, i.e. for localized and distributed RBs or RB groups. The zone patterns may be predefined. For example, the zone patterns may be based on a rule, e.g. there are two zones in a frequency band, with the default being either localized or distributed RB groups.

The information regarding the association of zones to sets of first transmission tier parameters may be explicitly transmitted to the UEs or may be implied if parameter sets and zone numbers are defined in order.

The information used in negotiation in zoning adjustment may include load and/or interference information for use in coordination/negotiation between network nodes, or at a centralized processing system to perform zone adjustment for multiple network nodes.

A UE does not need to know which zone belongs to which network node; the UE only needs to know the association of a zone pattern and associated first transmission tier transmission parameter sets with a pilot sequence.

Zone information, such as the zone patterns and associated first transmission tier transmission parameter sets, may be broadcasted to UEs. The zone information may be broadcast periodically or on an as-needed basis. For example, in some embodiments the zone information may be broadcast only if there is a change in parameters or zone pattern or zone association. The broadcast may only include updated parameter(s), e.g. if only the MCS is changed, then the broadcast may only identify the changed MCS, not all of the first transmission tier transmission parameters.

In some embodiments, if a new UE is entering the system, zone information may be unicast to the new UE. In other embodiments, the new UE has to wait for a periodic broadcast of the zone information.

As noted above, in some embodiments the number of zones and sets of associated first transmission tier transmission parameters may be determined based on the number of UE groups that result from grouping UEs according to some criterion or the number of network node groups that result from grouping network nodes according to some criterion.

Figure 7:
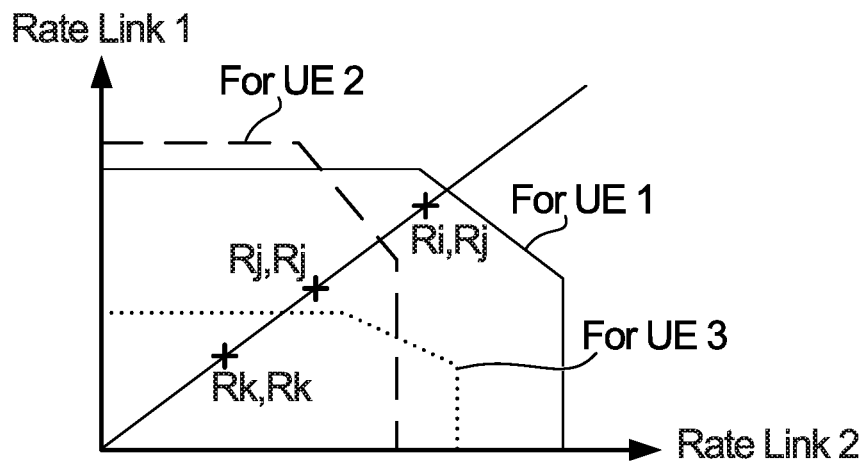
FIG. 7 illustrates multiple access capacity (MAC) regions for three user equipments (UEs) in a scenario in which different network nodes have the same first transmission tier throughput rate according to example embodiments described herein.

The UE grouping method for zoning and transmission parameter optimization is simple and applicable in scenarios where network nodes have the same zone pattern and provide first transmission tier links with the same MCS, thus providing the same spectral efficiency (SE) in bit per tone of an MCS FIG. 7 illustrates multiple access capacity (MAC) regions for three UEs in a scenario in which different network nodes have the same first transmission tier MCS or SE. The "Rate Link 1" axis of the plot depicted in FIG. 7 represents the possible SE achieved by an MCS transmitted by a first network node on a first layer in the first transmission tier. Similarly, the "Rate Link 2" axis represents the possible throughput rate transmitted by a second network node on a second layer in the first transmission tier. A UE may detect a layer only if the rate falls in its capacity region. As depicted in FIG. 7, different UEs may have different capacity regions. For example, if the rates for the first layer and the second layer are set at Rk (represented by the point Rk,Rk), then UE 1, UE 2 and UE 3 may be able to detect the first and second layers, because the point Rk,Rk falls within each of their capacity regions. If the rates for the first layer and the second layer are set at Rj, then only UE 1 and UE 2 may be able to detect the first and second layers, because the point Rj,Rj falls within the capacity regions of UE 1 and UE 2, but outside the capacity region of UE 3. Similarly, if the rates are set at Ri, then only UE 1 may be able to detect the first and second layers, because the point Ri,Ri falls only within the capacity region of UE 1. As depicted in FIG. 7, transmitting with lower rates in the first transmission tier may mean that more UEs are able to detect transmissions in the first transmission tier. However, it means the overall throughput is lower. In one embodiment of the UE grouping method, the number of zones for the zone pattern is determined based on the number of groups of UEs seeing different numbers of network nodes. The determination of how many network nodes a UE sees may be based on long-term path loss/received power at the UE, for example.

Table 2 below includes UE grouping results for an example scenario in which long-term received power at UEs is used to group UEs.

TABLE 2

| # TPs | % UEs seeing # TPs | Criteria for UE to see # TPs |
|---|---|---|
| 5 | 1.70% | P1-P5 <10 dB |
| 4 | 3.45% | P1-P4 <10 dB and P1-P5 >10 dB |
| 3 | 21.64% | P1-P3 <10 dB and P1-P4 >10 dB |
| 2 | 23.45% | P1-P2 <10 dB and P1-P3 >10 dB |

As indicated in the third column of Table 2, in this example the criterion for evaluating whether a UE sees a network node is whether the difference between the long-term received power from the network node is less than 10 dB lower than the long-term received power from the network node from which the UE receives the highest long-term received power (represented by P1). For example, a UE is considered to see four network nodes if the UE has four long-term received powers (represented by P1, P2, P3 and P4 when ranked in order of power) that are less than 10 dB lower than the UE's highest long-term received power P1. As indicated in Table 2, 3.45% of UEs in this example are found to satisfy this criterion, and thus are grouped into the UE group seeing four network nodes. It will be appreciated that the criteria indicated in the third column of Table 2 are merely illustrative examples and different criteria may be used in other embodiments.

In some cases, a threshold may be used to determine whether a group of UEs should have a zone associated with it. For example, a 20% threshold may be applied, whereby a group of UEs has a zone associated with it if the group includes at least 20% of the UEs. If such a threshold were applied to the UE groups in Table 2, then two zones would be defined for the two groups of UEs seeing two and three network nodes.

After the number of zones is determined, the first transmission tier transmission parameters associated with each zone can be determined. The parameters may be determined based on capacity-based calculations, statistics on joint decodability feedback, or some combination of the two, as described above.

Figure 8:
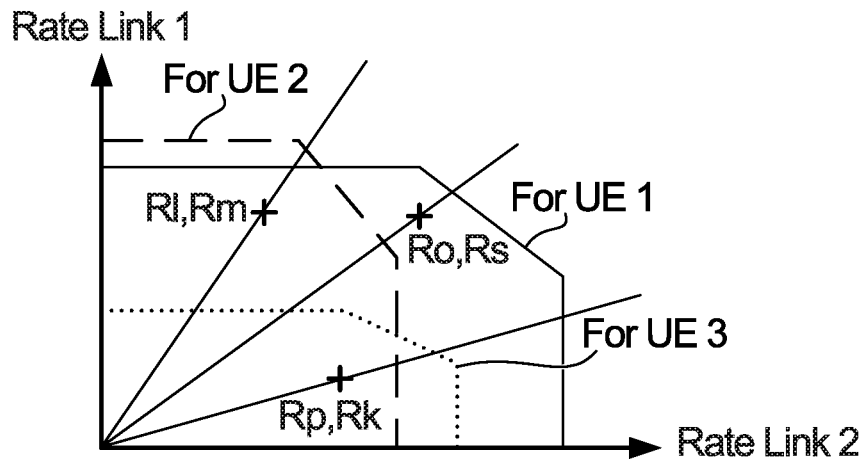
FIG. 8 illustrates MAC capacity regions for three UEs in a scenario in which different network nodes have different first transmission tier throughput rates according to example embodiments described herein.

The network node grouping method for zoning and first transmission tier transmission parameter optimization may be more applicable where rates for different first tier transmission links (i.e. first transmission tier transmission links from different network nodes) are different. FIG. 8 illustrates MAC capacity regions for three UEs in a scenario in which different network nodes have different first transmission tier throughput rates. The only difference between the scenario depicted in FIG. 7 and the scenario depicted in FIG. 8 is that in FIG. 7 all of the network nodes have the same rate, whereas in FIG. 8 not all the rates for all the network nodes are the same. As such, in different zones, some network nodes may send data with a higher rate than other network nodes, which may result in different decodability solutions for different UEs. In one embodiment of the network node grouping method, the number of zones for the zone pattern is determined based on the number of groups of network nodes.

Figure 9A:
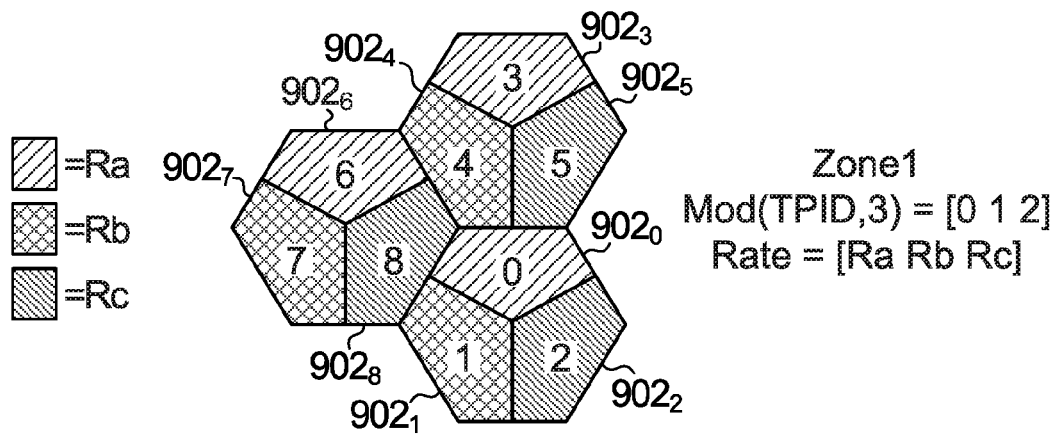
FIGS. 9A-9C illustrate an example of the grouping of network nodes and the allocation of different first transmission tier throughput rates to zones of time-frequency resources for each network node in a group according to example embodiments described herein.
Figure 9B:
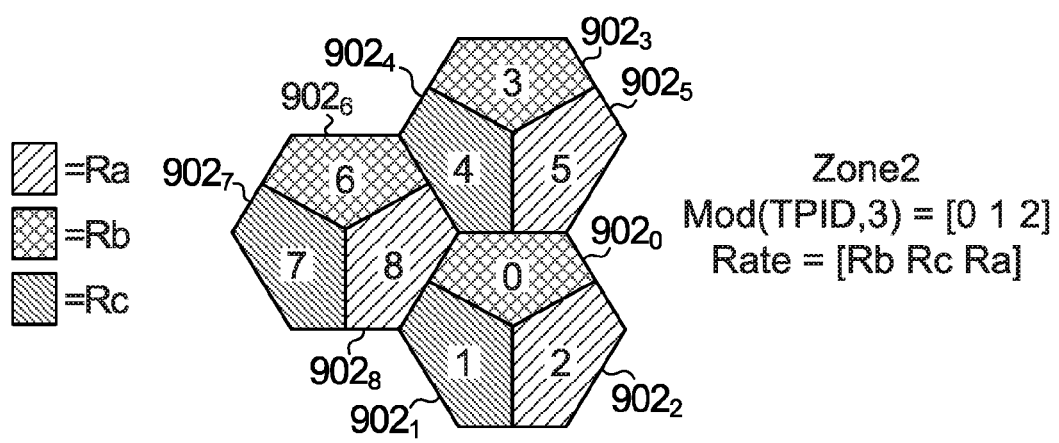
Figure 9C:
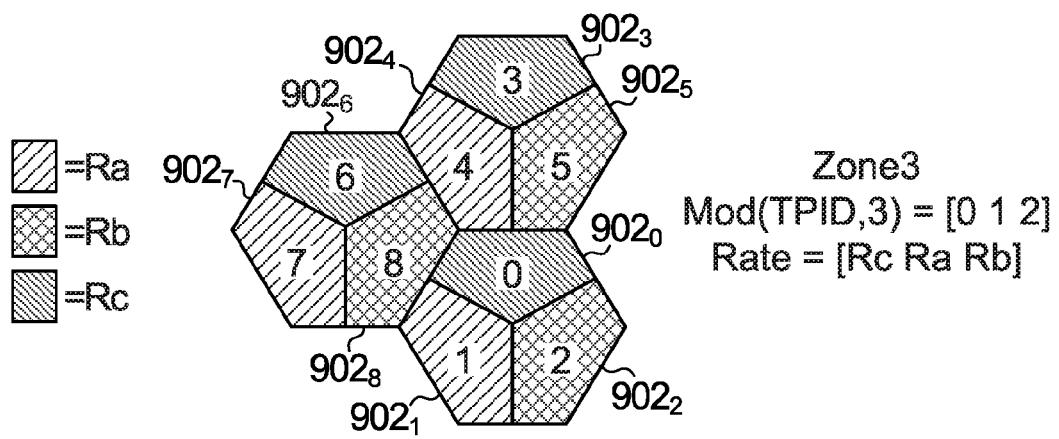

As discussed above, network nodes may be grouped based on a criterion, such as their TP ID. FIGS. 9A-9C illustrate an example of the grouping of nine network nodes $902_0$, $902_1$, $902_2$, $902_3$, $902_4$, $902_5$, $902_6$, $902_7$, and $902_8$ into three groups based on the TP IDs of the network nodes. In particular, in the illustrated example network nodes with the same mod(TP ID, # of TP groups) are grouped together. Network nodes $902_0$, $902_3$ and $902_6$ having TP IDs 0, 3 and 6, respectively, are grouped together; network nodes $902_1$, $902_4$ and $902_7$ having TP IDs 1, 4 and 7, respectively, are grouped together; and network nodes $902_2$, $902_5$ and $902_8$ having TP IDs 2, 5 and 8, respectively, are grouped together.

In the embodiment shown in FIGS. 9A-9C, the number of zones is equal to the number of network node groups, i.e. because there are three network node groups, there are three zones, namely Zone 1, Zone 2 and Zone 3.

FIGS. 9A, 9B and 9C indicate the rates provided by the network nodes 902 in each of the three zones, respectively. In particular, FIG. 9A indicates the rates provided by the network nodes 902 in Zone 1, FIG. 9B indicates the rates provided by the network nodes 902 in Zone 2, and FIG. 9C indicates the rates provided by the network nodes 902 in Zone 3.

To reduce signaling overhead, the first transmission tier transmission parameter sets associated with Zones 1, 2 and 3 for the three network node groups may be selected so that the rate vector for each zone, i.e. the vector of rates across the three network node groups for each zone, is a cyclic shifted version of the same set of rates=[Ra Rb Rc]. For example, as depicted in FIG. 9A, the rate vector for Zone 1 across the three network node groups is [Ra Rb Rc], the rate vector for Zone 2 across the three network node groups is [Rb Rc Ra] and the rate vector for Zone 3 across the three network node groups is [Rc Ra Rb]. As such, the network nodes $902_0$, $902_3$ and $902_6$, which are grouped in the network node group satisfying mod(TP ID, 3)=0, are configured so that three first transmission tier transmission parameter sets that provide rates Ra, Rb and Rc are respectively associated with Zone 1, Zone 2 and Zone 3. Similarly, the network nodes $902_1$, $902_4$ and $902_7$, which are grouped in the network node group satisfying mod(TP ID, 3)=1, are configured so that the three first transmission tier transmission parameter sets that provide rates Rb, Rc and Ra are respectively associated with Zone 1, Zone 2 and Zone 3. Finally, the network nodes $902_2$, $902_5$ and $902_8$, which are grouped in the network node group satisfying mod(TP ID, 3)=2, are configured so that three first transmission tier transmission parameter sets that provide rates Rc, Ra and Rb are respectively associated with Zone 1, Zone 2 and Zone 3.

Figure 10:
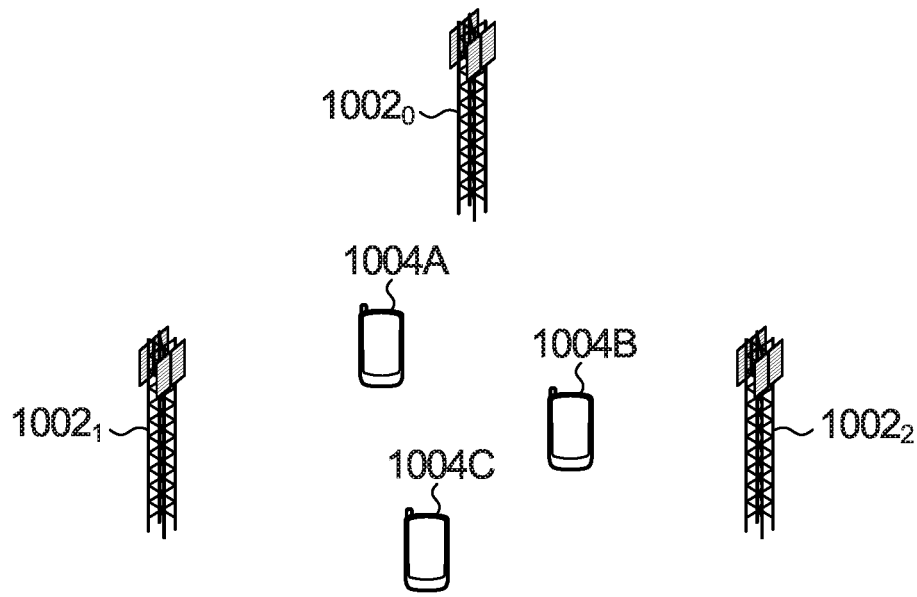
FIG. 10 is a block diagram illustrating a first transmission tier parameter optimization scheme in a communication network according to example embodiments described herein.

In some embodiments, the rate vector is optimized using MAC region equations. FIG. 10 is a block diagram illustrating a scenario in a communication network where such an optimization may be done for three network nodes $1002_0$, $1002_1$ and $1002_2$ to potentially provide service to three UEs 1004A, 1004B and 1004C. In the illustrated example, the network nodes $1002_0$, $1002_1$ and $1002_2$ are assigned TP IDs 0, 1 and 2, respectively, such that mod(TP ID, 3)=[0 1 2] for the three network nodes, i.e. each of the three network nodes is in a different network node group. If the first transmission tier transmission parameter sets for the three zones Zone 1, Zone 2 and Zone 3 are configured such that Ra>Rb>Rc, then data transmission for UE 1004A may be scheduled in Zone 1, because UE 1004A is closest, in order, to network nodes $1002_0$, $1002_1$ and $1002_2$, which are configured to provide rates Ra, Rb and Rc, respectively, in Zone 1. Similarly, data transmission for UE 1004B may be scheduled in Zone 2, because UE 1004B is closest, in order, to network nodes $1002_2$, $1002_0$ and $1002_1$, which are configured to provide rates Ra, Rb and Rc, respectively, in Zone 2.

Table 3 below includes a summary of simulated throughput and coverage for joint receivers and SIC receivers in simulation scenarios that include: CoMP transmission in one zone in the first transmission tier, CoMP transmission in two zones in the first transmission tier, and non-CoMP OFMDA transmission.

TABLE 3

| Max. No. Joint TPs | SCMA Rate per Link, R, same for all TPs | SCMA Alpha (α) | Joint Receiver | | SIC Receiver | |
|---|---|---|---|---|---|---|
| | | | TPUT (Mbps) | Cov. (kbps) | TPUT (Mbps) | Cov. (kbps) |
| | | 0 (OFDMA baseline) | 18.65 | 514.84 | 18.65 | 514.84 |
| 3 | 0.6 | 0.8 | 20.70 | 976.11 | 20.57 | 967.22 |
| 3 | 0.8 | 0.8 | 21.95 | 895.00 | 21.88 | 822.50 |
| 3 | 1 | 0.8 | 22.46 | 157.50 | 22.31 | 144.23 |
| 3 | 0.6, 0.8 (2 zones) | 0.8 | 21.35 | 1048.00 | 21.25 | 1037.80 |
| 3 | 0.56, 1 (2 zones) | 0.8 | 22.25 | 1006.8 | 22.15 | 983.65 |

Table 4 below includes a summary of the simulated gains in throughput and coverage for a joint receiver receiving CoMP transmission in two zones in the first transmission tier relative to CoMP transmission in one zone in the first transmission tier and non-CoMP OFDMA transmission.

TABLE 4

| | Joint Receiver | | |
|---|---|---|---|
| Cases | TPUT gain | Cov. gain | Eqv. gain |
| 2 Zones (R = 0.6, 0.8)/1 Zone (R = 0.6) | 3.11% | 7.36% | 15.15% |
| 2 Zones (R = 0.6, 0.8)/1 Zone (R = 0.8) | −2.74% | 17.09% | 10.24% |

TABLE 4-continued

| | Joint Receiver | | |
|---|---|---|---|
| Cases | TPUT gain | Cov. gain | Eqv. gain |
| 2 Zones (R = 0.56, 1)/1 Zone (R = 0.6) | 7.48% | 3.14% | 21.84% |
| 2 Zones (R = 0.56, 1)/1 Zone (R = 0.8) | 1.37% | 12.49% | 15.93% |
| 2 Zones (R = 0.6, 0.8)/OFDMA | 14.50% | 103.56% | 139.82% |
| 2 Zones (R = 0.56, 1.0)/OFDMA | 19.35% | 95.55% | 143.93% |

As indicated in Table 4, with a zone pattern that includes two zones in the first transmission tier, equivalent gains of more than 10% are observed compared to a configuration having only one zone. It is noted that the Eqv. gain given in the fourth column of Table 4 is a calculated metric that is determined according to:

$$\text{Eqv. gain} = \text{TPUT gain} \times 2.5 + \text{Cov. gain} \qquad (2)$$

Figure 11:
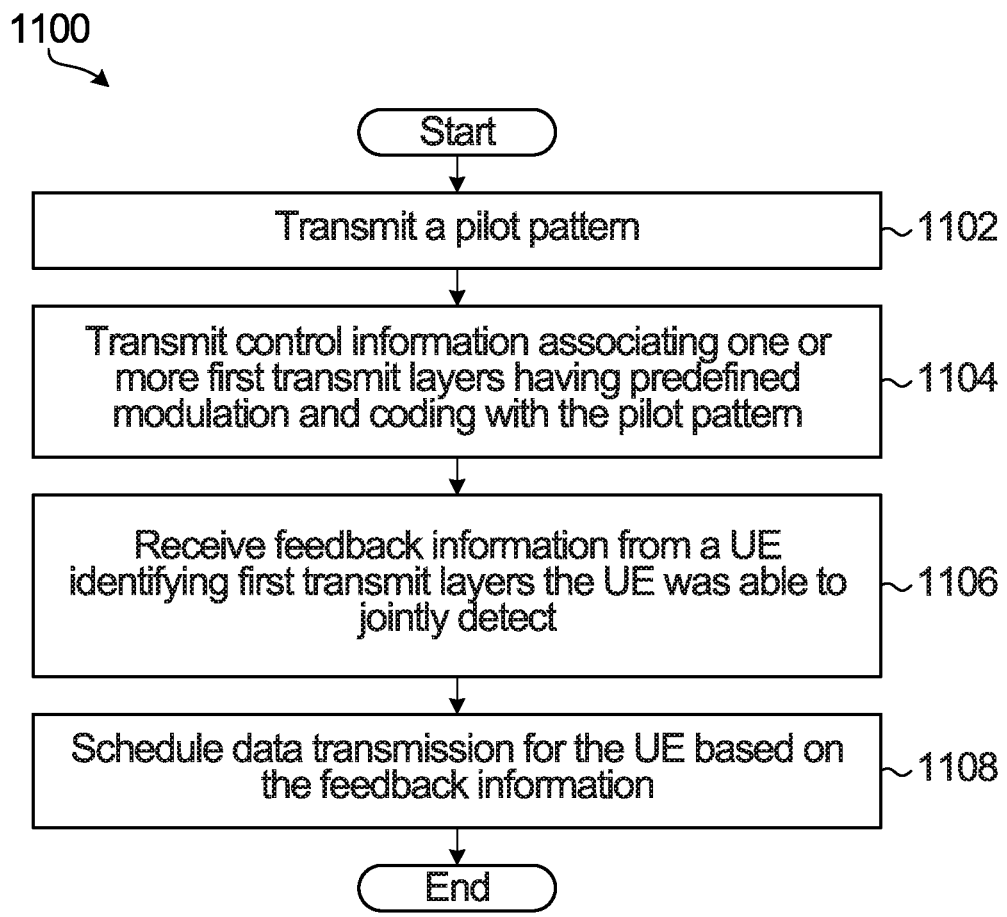
FIG. 11 illustrates a flow diagram of example operations in a network device according to example embodiments described herein.

FIG. 11 illustrates a flow diagram of example operations 1100 in a network device according to example embodiments described herein. Operations 1100 may be indicative of operations occurring in a network node such as an eNB, a picocell or the like.

Operations 1100 begin with transmitting a pilot pattern from an antenna port of the network device (block 1102). Control information associating one or more first transmit layers having predefined modulation and coding with the pilot pattern is transmitted (block 1104). The first transmit layers having predefined modulation and coding are multiplexed in a time-frequency resource space in at least one of: a time domain, a frequency domain, a code domain, a power domain, and a space domain. For example, the first transmit layers may be transmit layers multiplexed in the first transmission tier discussed above. The control information that is transmitted at block 1104 may indicate the pilot pattern that is associated with each first transmit layer and a predefined MCS associated with each first transmit layer. In some embodiments, the control information may also include information indicating a transmit power associated with each transmit layer. For example, the control information may indicate the power sharing factor α described above for each transmit layer. In other embodiment, the power sharing factor α may be blindly detected by UEs.

The operations 1100 further include receiving feedback information from a UE identifying first transmit layers the UE was able to jointly detect (block 1106). The UE may be a smartphone, a sensor, a personal computer, a tablet or the like. Data transmission for the UE is scheduled by the network device based on the feedback information from the UE (block 1108).

As noted above, the first transmit layers having predefined modulation and coding may be multiplexed in a first transmission tier that at least partially overlaps time-frequency resources with a second transmission tier in which second transmit layers having adaptive modulation and coding are multiplexed. In such embodiments, the feedback information received at block 1106 may identify first transmit layers having predefined modulation and coding that the UE was able to jointly detect in the first transmission tier and/or channel quality indicators (CQIs) for second transmit layers having adaptive modulation and coding in the second transmission tier.

In some embodiments, operation 1100 further include adjusting the feedback information received from the UE at block 1106 based on an average number of transmit layers the UE has received at each of a number of scheduling intervals. In other embodiments, operation 1100 further include receiving, from a central coordinator, a feedback adjustment instruction regarding adjustment of the feedback information from the UE received at block 1106. The feedback information from the UE may then be adjusted in accordance with the feedback adjustment instruction. In both scenarios, scheduling data transmission for the UE at block 1108 may then be based on the adjusted feedback information.

In some embodiments, scheduling data transmission for the UE at block 1108 involves including the UE in a pool of scheduling candidates if the feedback information received from the UE at block 1106 indicates that the UE was able to detect one or more transmit layers associated with the pilot pattern transmitted by the network node. If the feedback information provided by the UE is soft info, e.g. a difference between SINR of a transmit layer and a decodable SINR threshold of the transmit layer, then the network node can adjust its pool of scheduling candidates. In such embodiments, the scheduling at block 1108 may further be based on a proportional fairness performance measure for the UE among the pool of scheduling candidates.

In some embodiments, scheduling data transmission for the UE at block 1108 involves scheduling data transmission for the UE in the first transmission tier or the second transmission tier jointly from the pool of scheduling candidates.

In other embodiments, the network node maintains a first pool of scheduling candidates for the first transmission tier and a second pool of scheduling candidates for the second transmission tier. In such embodiments, a UE is included in one or both of the first and second pools of scheduling candidates based on the feedback information received from the UE at block 1106. Scheduling data transmissions for the UE at block 1108 involves scheduling data transmissions for UEs from the first pool of scheduling candidates independently of scheduling data transmissions for UEs from the second pool of scheduling candidates.

The example operations 1100 are illustrative of an example embodiment. Various ways to perform the illustrated operations, as well as examples of other operations that may be performed, are described herein. Further variations may be or become apparent.

Figure 12:
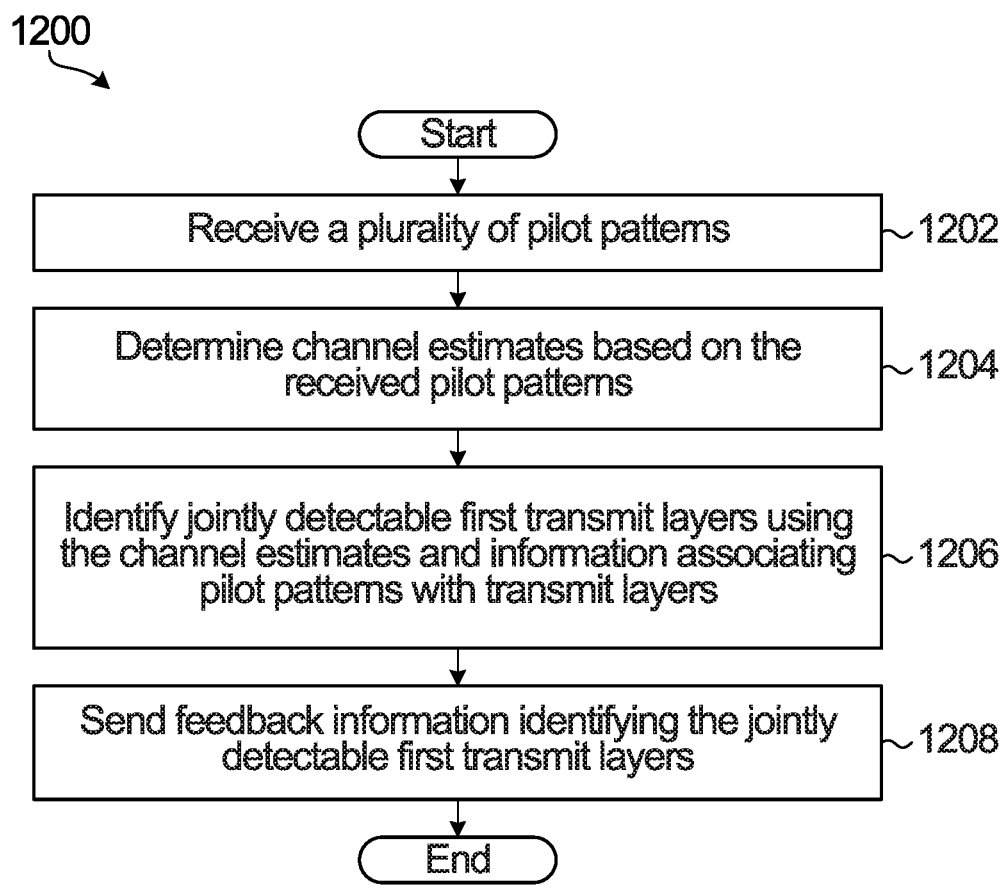
FIG. 12 illustrates a flow diagram of example operations in a UE according to example embodiments described herein.

FIG. 12 illustrates a flow diagram of example operations 1200 in a UE according to example embodiments described herein. Operations 1200 may be indicative of operations in a UE such as a smartphone, a sensor, a personal computer, a tablet or the like.

Operations 1200 begin with the UE receiving a plurality of pilot patterns (block 1202). For each of the received pilot patterns, the UE determines a respective channel estimate (block 1204). As noted above, the UE may only determine a respective channel estimate for the dominant pilot patterns that are received. Using the channel estimates and information associating pilot patterns with transmit layers, the UE identifies jointly detectable first transmit layers having predefined modulation and coding (block 1206). As noted above, the first transmit layers may be multiplexed in a time-frequency resource space in at least one of: a time domain, a frequency domain, a code domain, a power domain, and a space domain. The UE sends feedback information identifying the jointly detectable first transmit layers (block 1208). For example, the UE may send feedback information that indicates the indices or labels of the jointly detectable first transmit layers.

In some embodiments, identifying jointly detectable first transmit layers at block 1206 involves determining the joint detectability of a first transmit layer based on: the channel estimate that is associated with the pilot pattern that is associated with the first transmit layer, a predefined MCS that is associated with the first transmit layer, and a transmit power that is associated with the first transmit layer.

In some embodiments, operations 1200 further include receiving control information from one or more network nodes associating first transmit layers with pilot patterns and predefined MCSs. The control information may also associate first transmit layers with a power sharing factor.

The first transmit layers may be multiplexed in a first transmission tier that at least partially overlaps with a second transmission tier in which second transmit layers having adaptive modulation and coding are multiplexed, as discussed above. In such embodiments, the operations 1200 may further include using the channel estimates and the information associating transmit layers with pilot patterns to determine SINRs for second transmit layers in the second transmission tier. The determination of the SINR for a second transmit layer in the second transmission tier may be based on a channel estimate that is associated with the pilot pattern that is associated with the second transmit layer and a transmit power associated with the second transmit layer. To determine the SINRs of second transmit layers in the second transmission tier, the UE may first subtract, from a received signal, the jointly detectable first transmit layers in the first transmission tier. Then, from a remainder of the received signal remaining after the subtraction of the jointly detectable first transmit layers, the UE may determine SINRs for second transmit layers multiplexed in the second transmission tier based on the associated channel estimate and transmit power.

In some embodiments, operations 1200 further include determining channel quality indicators (CQIs) for the second transmit layers in the second transmission tier. The CQIs may be based on the SINRs for the second transmit layers, for example. In such embodiments, the feedback information sent at block 1208 may also indicate the CQIs determined for the second transmit layers in the second transmission tier.

In some embodiments, identifying a number of jointly detectable transmit layers having predefined modulation and coding at block 1206 involves jointly detecting first transmit layers in the first transmission tier, treating second transmit layers in the second transmission tier as interference.

In some embodiments, the first transmit layers are multiplexed in a time-frequency resource space that includes multiple zones of time-frequency resources. In such embodiments, the feedback information sent at block 1208 may include zone-specific feedback information that, for each of one or more zones, identifies a number of jointly detectable first transmit layers in the zone.

The example operations 1200 are illustrative of an example embodiment. Various ways to perform the illustrated operations, as well as examples of other operations that may be performed, are described herein. Further variations may be or become apparent.

Figure 13:
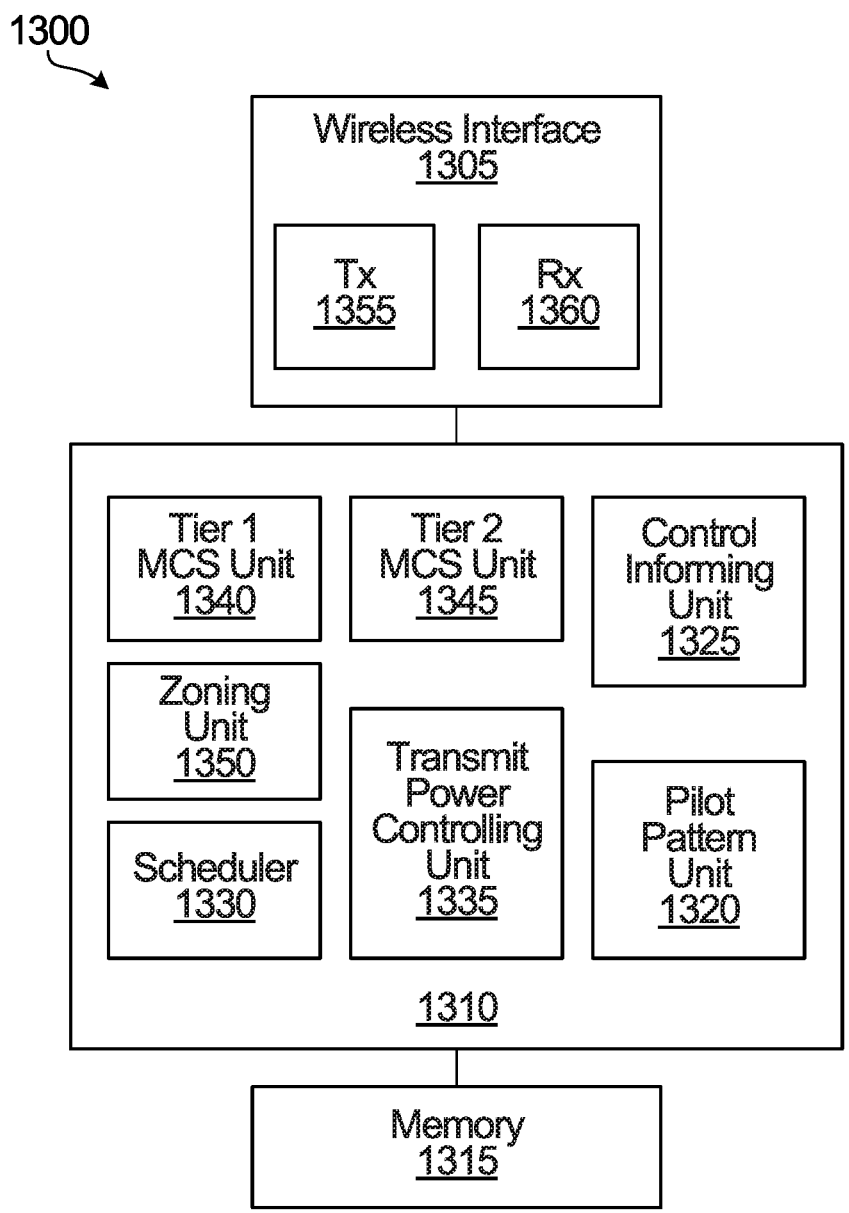
FIG. 13 illustrates a block diagram of a network device according to example embodiments described herein.

FIG. 13 illustrates a block diagram of an example communication device 1300 according to example embodiments described herein. Communication device 1300 may be an implementation of a network device, such as an eNB, a picocell or the like. Communication device 1300 may be used to implement various ones of the embodiments discussed herein.

As shown in FIG. 13, communication device 1300 includes a wireless interface 1305. Wireless interface 1305 includes a transmitter 1355 configured to send messages, and a receiver 1360 configured to receive messages.

A pilot pattern unit 1320 is configured to transmit a pilot pattern via wireless interface 1305.

A control informing unit 1325 is configured to transmit, via wireless interface 1305, control information associating one or more first transmit layers having predefined modulation and coding with the pilot pattern.

A scheduler 1330 is configured to receive, via wireless interface 1305 feedback information from a UE indicating a number of transmit layers having predefined modulation and coding the UE was able to jointly detect. Scheduler 1330 is further configured to schedule data transmission for the UE based on the feedback information.

A transmit power controlling unit 1335 is configured to control the transmit power of data transmissions from the wireless device 1300. In general, the power sharing factor $\alpha$ for the first transmission tier is predetermined and only adjusted semi-statically.

In some embodiments, scheduler 1330 is configured to schedule data transmissions for UEs in first and second transmission tiers in respective time-frequency resources that at least partially overlap, as discussed previously. The first transmission tier having predefined modulation and coding, and the second transmission tier having adaptive modulation and coding. In such embodiments, a tier 1 MCS unit 1340 is configured to control the predefined modulation and coding that is applied to data for data transmissions that the scheduler 1320 schedules in the first transmission tier. Similarly, a tier 2 MCS unit 1345 is configured to control the adaptive modulation and coding that is applied to data for data transmissions that the scheduler 1330 schedules in the second transmission tier. For example, tier 2 MCS unit 1345 may be configured to control the adaptive modulation and coding based on CQI feedback information from the UEs for which data transmissions are scheduled in the second transmission tier. Also in such embodiments, the transmit power controlling unit 1335 is configured to control how a total transmission power level for the network device 1300 is shared between first and second transmission tier layers. For example, the transmit power controlling unit 1335 may control how the power is shared by adjusting a power sharing factor $\alpha$, as discussed previously. In some embodiments, the control information that is transmitted by the control informing unit 1325 also associates a power sharing factor $\alpha$ for the first transmission tier with the pilot pattern that is transmitted by pilot pattern unit 1320.

In some embodiments, scheduler 1330 is configured to adjust the feedback information based on additional information provided by the UE regarding the average number of transmit layers the UE has recently received at each scheduling interval. Alternatively, scheduler 1330 may be configured to receive an adjustment instruction from a central coordinator and adjust the feedback information from the UE in accordance with the feedback adjustment instruction.

In some embodiments the time-frequency resource space in which the transmit layers having predefined modulation and coding are multiplexed (e.g., the first transmission tier) may be divided into multiple zones of time-frequency resources, as discussed above. In such embodiments, a zoning unit 1350 is configured to define the multiple zones in the time-frequency resource space and associate sets of transmission parameters with each zone. The set of transmission parameters associated with a zone may include the number of layers used by a network node in the zone and each transmit layer's associated MCS and transmit power, for example. The definition of the zones and associated parameter sets may be determined based on the UE grouping method or network node grouping method described above. In some embodiments, zoning unit 1350 is configured to transmit, via wireless interface 1305, zoning information to UEs regarding the definition of zones and the sets of transmission parameters associated with respective zones.

A memory 1315 is configured to store information regarding UEs in the vicinity of the network device, such as the number of first transmission tier layers a UE is capable of decoding, the SINR of second transmission tier signals at a UE, CQI feedback information from the UE, packet error rates and/or re-transmission rates for the UE, scheduling of data transmissions for the UE, and the like, as well as zoning information and pre-defined modulation and coding scheme(s) for the first transmission tier and adaptive modulation and coding scheme(s) for the second transmission tier and their associated adaptation parameters, for example.

The elements of communication device 1300 may be implemented as specific hardware logic blocks. In an alternative embodiment, the elements of communication device 1300 may be implemented as software executing in a processor, controller, or application specific integrated circuit. In yet another alternative, the elements of communication device 1300 may be implemented as a combination of software and/or hardware.

As an example, transmitter 1355 and receiver 1360 may be implemented as a specific hardware block, and pilot pattern unit 1320, control informing unit 1325, scheduler 1330, transmit power controlling unit 1335, tier 1 MCS unit 1340, tier 2 MCS unit 1345 and zoning unit 1350 may be software modules executing in a processor 1310, such as a microprocessor, a digital signal processor, a custom circuit, or a custom compiled logic array of a field programmable logic array. Pilot pattern unit 1320, control informing unit 1325, scheduler 1330, transmit power controlling unit 1335, tier 1 MCS unit 1340, tier 2 MCS unit 1345 and zoning unit 1350 may be modules stored in memory 1315.

Figure 14:
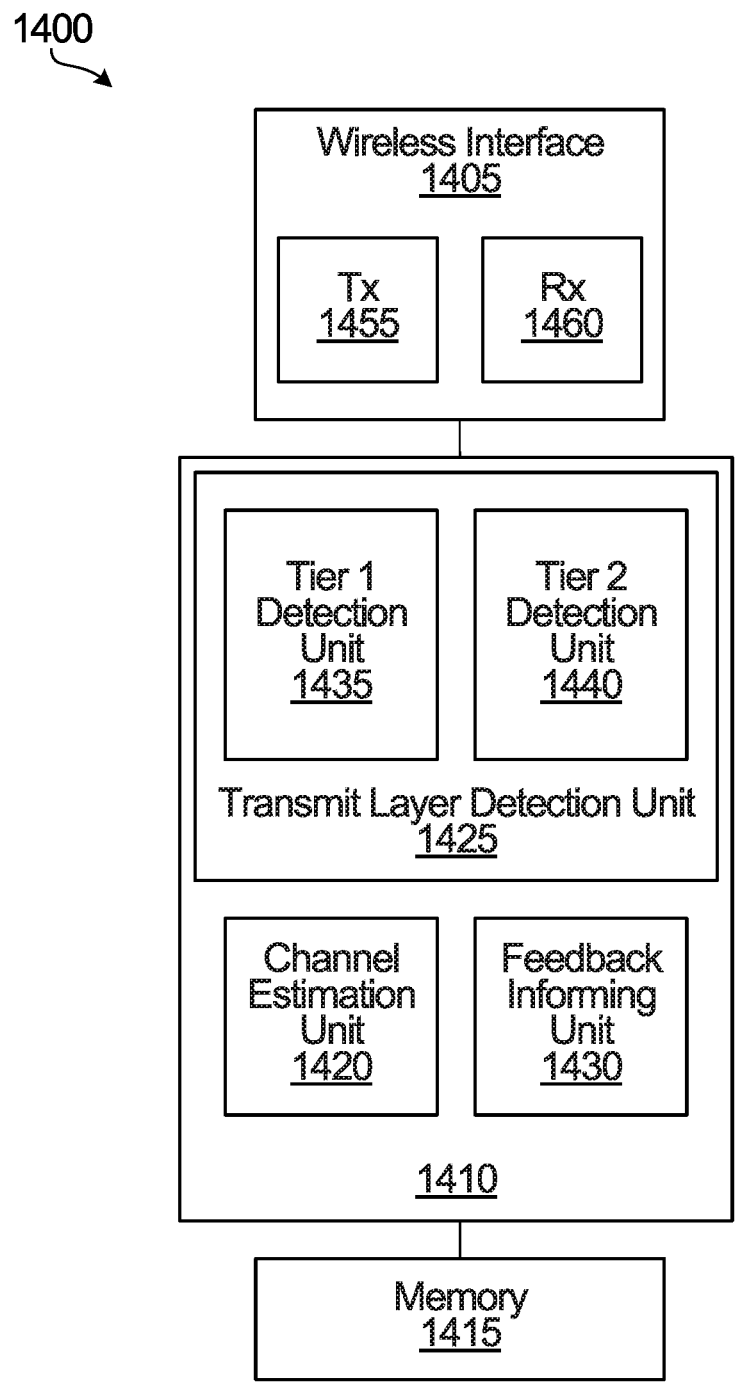
FIG. 14 illustrates a block diagram of a UE according to example embodiments described herein.

FIG. 14 illustrates a block diagram of an example communication device 1400 according to example embodiments described herein. Communication device 1400 may be an implementation of a UE, such as a smartphone, a sensor, a PC, a tablet or the like. Communication device 1400 may be used to implement various ones of the embodiments discussed herein.

As shown in FIG. 14, communication device 1400 includes a wireless interface 1405. Wireless interface 1405 includes a transmitter 1455 configured to send messages, and a receiver 1460 configured to receive messages.

A channel estimation unit 1420 is configured to receive a plurality of pilot patterns via wireless interface 1405 and determine a respective channel estimate for each pilot pattern. As noted above, the received pilot patterns may only include dominant pilot patterns.

A transmit layer detection unit 1425 is configured to use the channel estimates generated by channel estimation unit 1420 and information associating pilot patterns with transmit layers to identify jointly detectable first transmit layers having predefined modulation and coding.

A feedback informing unit 1430 is configured to send feedback information to one or more network nodes identifying the jointly detectable first transmit layers identified by transmit layer detection unit 1425.

In some embodiments, transmit layer detection unit 1425 is configured to receive, via wireless interface 1405, control information associating transmit first layers with pilot patterns and predefined MCSs. The control information may also associate first transmit layers with transmit powers.

Transmit layer detection unit 1425 then uses this control information in conjunction with the channel estimates determined by channel estimation unit 1420 to identify jointly detectable first transmit layers.

The jointly detectable first transmit layers may be multiplexed in a first transmission tier that at least partially overlaps with a second transmission tier in which second transmit layers having adaptive modulation and coding are multiplexed, as discussed above. In such embodiments, transmit layer detection unit 1425 may include a tier 1 detection unit 1435 configured to identify jointly detectable first transmit layers in the first transmission tier and a tier 2 detection unit 1440 configured to determine SINRs for second transmit layers in the second transmission tier. The determination of the SINR for a second transmit layer in the second transmission tier may be based on a transmit power associated with the second transmit layer and a channel estimate that is associated with the pilot pattern that is associated with the second transmit layer.

In some embodiments, tier 2 detection unit 1440 is further configured to determine CQIs for the second transmit layers in the second transmission tier. The CQIs may be based on the SINRs for the second transmit layers, for example. In such embodiments, the feedback information sent by feedback informing unit 1430 may also indicate the CQIs determined for the second transmit layers in the second transmission tier.

In some embodiments, the jointly detectable first transmit layers are multiplexed in a time-frequency resource space (e.g., the first transmission tier discussed above) that includes multiple zones of time-frequency resources. In such embodiments, feedback informing unit 1430 is configured to provide zone-specific feedback information that identifies, for each of at least one of the zones, the jointly detectable first transmit layers in the zone.

If the UE 1400 has a data transmission scheduled in the first transmission tier by at least one network node, then the tier 1 detection unit 1435 is further configured to extract its scheduled transmission from the detected transmissions in the first transmission tier and discard the other jointly detected transmissions in the first transmission tier.

If the UE 1400 has a data transmission scheduled in the second transmission tier, the tier 2 detection unit 1440 is configured to subtract, from the received transmissions, the transmissions in the first transmission tier that were jointly detected by the tier 1 detection unit 1435. For example, the tier 2 detection unit 1440 may be configured to use SIC to subtract the jointly detected transmissions in the first transmission tier. Once the jointly detected transmissions in the first transmission tier have been subtracted from the received transmissions, the tier 2 detection unit 1440 detects, from a remainder of the received transmissions, a transmission for the UE 1400 in the second transmission tier.

In some embodiments, if the UE 1400 has a data transmission scheduled in the second transmission tier, the tier 1 detection unit 1435 is configured to jointly detect first transmission tier transmissions from at least the network node(s) that have scheduled data transmission for the UE in the second transmission tier.

In some embodiments, the first transmission tier includes several zones of time-frequency resources, as discussed above. In some such embodiments, if the UE 1400 has a data transmission scheduled in the second transmission tier, the tier 2 detection unit 1440 may be configured to subtract the jointly detected transmissions that are in zone(s) in the first transmission tier that overlap in time-frequency resources with the UE's scheduled data transmission in the second transmission tier.

A memory 1415 is configured to store information regarding the first and second transmission tiers, such as the predefined modulation and coding of the first transmission tier, the adaptive modulation and coding of the second transmission tier, a number of layers, and indices of those layers, that may be allocated to the UE 1400 in the first transmission tier, power sharing factors of network nodes in its vicinity, a potential serving set of network nodes in its vicinity, CQI feedback information such as the number of layers that the UE 1400 is able to decode in the first transmission tier and/or SINR of communication signals in the second transmission tier, and the like.

The elements of communication device 1400 may be implemented as specific hardware logic blocks. In an alternative embodiment, the elements of communication device 1400 may be implemented as software executing in a processor, controller, application specific integrated circuit. In yet another alternative, the elements of communication device 1400 may be implemented as a combination of software and/or hardware.

As an example, transmitter 1455 and receiver 1460 may be implemented as a specific hardware block, and channel estimation unit 1420, transmit layer detection unit 1425 and feedback informing unit 1430 may be software modules executing in a processor 1410, such as a microprocessor, a digital signal processor, a custom circuit, or a custom compiled logic array of a field programmable logic array. Channel estimation unit 1420, transmit layer detection unit 1425 and feedback informing unit 1430 may be modules stored in memory 1415.

Embodiments disclosed herein enable distributed and open-loop multi-user CoMP scheduling and transmission, which can potentially improve the user experience at cell-edges by allowing more network nodes to simultaneously transmit to a UE. From the network perspective, embodiments of the multi-tier scheduling and transmission approach disclosed herein can potentially be implemented with low scheduling complexity, because the scheduling can be done at each network node independently with low/no information sharing between network nodes. Embodiments also potentially allow easy and flexible mobility management and open-loop multi-user multiplexing to boost cell throughput with robustness to mobility and CSI feedback accuracy. Moreover, some embodiments allow UE-centric CoMP transmission, where each UE selects its own potential serving set of network nodes to potentially serve the UE. However, embodiments disclosed herein are not limited to multi-tiered open-loop multi-user CoMP implementations, as they include features that are also applicable to one-tier, non-CoMP, centralized scheduling and transmission technologies.

Embodiments contemplated herein may be suitable to applications envisaged in the next generation 5G wireless network, including ultra-dense network (UDN) implementations, where UEs may experience many cell-edges and strong interference from network nodes/TPs in neighboring cells, as well as moving network (MN) and vehicle-to-vehicle (V2V) networks, where high mobility is a challenge. In particular, embodiments of the present disclosure provide flexible and easy mobility management and enable multi-user multiplexing with robustness to mobility and channel aging which are expected to be key requirements in 5G scenarios including UDN and MN/V2V with high speed users.

Numerous modifications and variations of the present application are possible in light of the above teachings. It is therefore to be understood that within the scope of the appended claims, the application may be practised otherwise than as specifically described herein.

In addition, although described primarily in the context of methods, apparatus and equipment, other implementations are also contemplated, such as in the form of instructions stored on a non-transitory computer-readable medium, for example.

We claim:

1. A method in a network node, the method comprising:
   transmitting a pilot pattern; and
   transmitting control information associating one or more first downlink transmit layers with the pilot pattern, each of the one or more first downlink transmit layers having a predefined modulation and coding scheme (MCS) without dynamic MCS adaptation and being multiplexed in a time-frequency resource space in at least one of: a time domain, a frequency domain, a code domain, a power domain, or a space domain, wherein the first downlink transmit layers are multiplexed in a first transmission tier: receiving, from a user equipment (UE), feedback information comprising at least one of: information identifying first downlink transmit layers jointly detectable by the UE in the first transmission tier; AND information identifying channel quality indicators (COIs) for second downlink transmit layers having adaptive modulation and coding and being multiplexed in a second transmission tier, the first and second transmission tiers being in respective time-frequency resource spaces that at least partially overlap; and scheduling downlink data transmission for the UE based on the feedback information.

2. The method of claim 1, wherein, for each of the one or more first transmit layers, the control information comprises information indicating:
   the pilot pattern that is associated with the downlink transmit layer; and
   the predefined MCS associated with the downlink transmit layer.

3. The method of claim 2, wherein:
   the one or more first downlink transmit layers are transmitted using sparse code multiple access (SCMA) or low density signature orthogonal frequency division multiplexing (LDS-OFDM) waveforms; and
   the control information further comprises information indicating codebooks or signatures associated with the one or more first downlink transmit layers.

4. The method of claim 2, wherein the control information further comprises information indicating a transmit power associated with the downlink transmit layer.

5. The method of claim 1, further comprising:
   adjusting the feedback information received from the UE based on an average number of downlink transmit layers the UE has received at each of a number of scheduling intervals; and
   scheduling downlink data transmission for the UE based on the adjusted feedback information.

6. The method of claim 1, further comprising:
   receiving, from a central coordinator, a feedback adjustment instruction regarding adjustment of the feedback information from the UE;
   adjusting the feedback information from the UE in accordance with the feedback adjustment instruction; and
   scheduling downlink data transmission for the UE based on the adjusted feedback information.

7. The method of claim 1, further comprising:
triggering a hybrid automatic repeat request (HARQ) mechanism and/or an outer loop link adaptation (OLLA) mechanism in the second transmission tier based on receipt of an acknowledgement (ACK) or negative acknowledgement (NACK) from the UE regarding a data packet transmitted in the second transmission tier; and
in response to receiving a NACK from the UE regarding a data packet transmitted in the second transmission tier, rescheduling the downlink data transmission in the first transmission tier if a resend rate in the second transmission tier is below a threshold.

8. A network device comprising: a wireless interface;
a processor operatively coupled to the wireless interface; and
a computer readable storage medium operatively coupled to the processor, the computer readable storage medium storing programming for execution by the processor, the programming comprising instructions to:
transmit, via the wireless interface, a pilot pattern; and
transmit, via the wireless interface, control information associating one or more first downlink transmit layers with the pilot pattern, each of the one or more first downlink transmit layers having a predefined modulation and coding scheme (MCS) without dynamic MCS adaptation and being multiplexed in a time-frequency resource space in at least one of: a time domain, a frequency domain, a code domain, a power domain, or a space domain, wherein the first downlink transmit layers are multiplexed in a first transmission tier;
receive, via the wireless interface, feedback information from a user equipment (UE), the feedback information comprising at least one of:
information identifying first downlink transmit layers jointly detectable by the UE in the first transmission tier; AND
information identifying channel quality indicators (CQIs) for second downlink transmit layers having adaptive modulation and coding and being multiplexed in a second transmission tier, the first and second transmission tiers being in respective time-frequency resource spaces that at least partially overlap; and schedule downlink data transmission for the UE based on the feedback information.

9. The network device of claim 8, wherein, for each of the one or more first downlink transmit layers, the control information comprises information indicating:
the pilot pattern that is associated with the downlink transmit layer; and
the predefined MCS associated with the transmit layer.

10. The network device of claim 9, wherein the control information further comprises information indicating a transmit power associated with the downlink transmit layer.

11. The network device of claim 8, wherein the instructions further comprise instructions to:
adjust the feedback information received from the UE based on an average number of downlink transmit layers the UE has received at each of a number of scheduling intervals; and
schedule downlink data transmission for the UE based on the adjusted feedback information.

* * * * *